(12) United States Patent
Sato et al.

(10) Patent No.: US 11,865,606 B2
(45) Date of Patent: Jan. 9, 2024

(54) MANUFACTURING METHOD AND MANUFACTURING DEVICE FOR LINK PART

(71) Applicant: NIPPON STEEL CORPORATION, Tokyo (JP)

(72) Inventors: Masahiko Sato, Tokyo (JP); Masaaki Mizumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 77 days.

(21) Appl. No.: 17/600,144

(22) PCT Filed: Mar. 25, 2020

(86) PCT No.: PCT/JP2020/013186
§ 371 (c)(1),
(2) Date: Sep. 30, 2021

(87) PCT Pub. No.: WO2020/213354
PCT Pub. Date: Oct. 22, 2020

(65) Prior Publication Data
US 2022/0203420 A1    Jun. 30, 2022

(30) Foreign Application Priority Data

Apr. 15, 2019  (JP) ................................. 2019-077157

(51) Int. Cl.
*B21D 5/01*    (2006.01)
*B21D 19/08*   (2006.01)
*B21D 53/88*   (2006.01)

(52) U.S. Cl.
CPC ............... *B21D 5/01* (2013.01); *B21D 19/08* (2013.01); *B21D 53/88* (2013.01); *B60G 2206/8209* (2013.01)

(58) Field of Classification Search
CPC .......... B21D 5/01; B21D 19/08; B21D 53/88; B21D 28/26; B60G 2206/8209;
(Continued)

(56) References Cited

U.S. PATENT DOCUMENTS 5,810,377 A * 9/1998 Keeler ................. B60G 9/00
301/124.1
8,752,850 B2 * 6/2014 Ueno ................. B60G 7/001
280/124.121

(Continued)

FOREIGN PATENT DOCUMENTS

EP          2 891 565 A1    7/2015
JP          2010-126095 A   6/2010
WO     WO 2015/145701 A1  10/2015

*Primary Examiner* — Lawrence Averick
(74) *Attorney, Agent, or Firm* — Birch, Stewart, Kolasch & Birch, LLP

(57) ABSTRACT

This manufacturing method for a link part is a method of manufacturing a link part having one end portion having a connecting hole and provided on one side in one direction from an intermediate part which is long in the one direction and has a first side wall and a second side wall each having a pilot hole at least at one end portion and disposed to face each other and a connecting wall connecting one side edge of the first side wall and one side edge of the second side wall, and the other end portion provided on the other side therefrom in the one direction. The method includes a reinforcing process of inserting a metal core into the pilot hole, and an O-bending process of O-bending the first side wall and the second side wall so that the other side edge of the first side wall and the other side edge of the second side wall are brought into contact with each other after the reinforcing process.

14 Claims, 9 Drawing Sheets

(58) Field of Classification Search
CPC .......... B60G 2206/013; B60G 2206/11; B60G 2206/8102; B60G 2206/8103; B60G 7/001
See application file for complete search history.

(56) References Cited

U.S. PATENT DOCUMENTS

| | | | |
|---|---|---|---|
| 9,090,138 B2* | 7/2015 | Haselhorst | B60G 7/001 |
| 2014/0008886 A1* | 1/2014 | Ueno | B60G 7/001 |
| | | | 280/124.1 |
| 2015/0008654 A1* | 1/2015 | Haselhorst | B60G 7/001 |
| | | | 280/124.128 |
| 2017/0144499 A1 | 5/2017 | Kimura et al. | |
| 2019/0061453 A1* | 2/2019 | Branger | B60G 7/001 |

* cited by examiner

MANUFACTURING METHOD AND MANUFACTURING DEVICE FOR LINK PART

TECHNICAL FIELD

The present invention relates to a manufacturing method and a manufacturing device for a link part.

Priority is claimed on Japanese Patent Application No. 2019-077157, filed in Japan on Apr. 15, 2019, the content of which is incorporated herein by reference.

BACKGROUND ART

As is well known, as a structural part connecting between a plurality of objects, there are link parts in which a joint part is formed at an end portion or an intermediate position thereof. Link parts are used for various applications such as, for example, for building structures or suspensions of automobiles.

For example, suspension links such as lower links, upper links, and lateral links are used in suspension devices of automobiles. These link parts have connecting holes through which a shaft body for connecting to another structural part is inserted. There are roughly two methods of manufacturing a link part.

One of them is a method of subjecting a hollow raw pipe to forming processing to obtain a product shape and then making a pilot hole by piercing processing. In this case, the pilot hole may be used as it is as the above-described connecting hole, or the pilot hole may be further subjected to burring to be used as the connecting hole. When burring is performed in the manufacturing method, special processing using a flow drill or the like is required.

Therefore, as another manufacturing method, there is a method of obtaining a product shape by forming a connecting hole in a flat plate material first and then applying forming processing to form it into a hollow tubular shape. In this manufacturing method, since the connecting hole is formed at the time of having the flat plate material, no special processing is required even when burring is performed.

Patent Document 1 discloses an example of a manufacturing method for obtaining a link part from a flat plate material.

This manufacturing method at least includes the following processing and first to fourth processes below are sequentially executed.

(1) A first process of obtaining a workpiece P as a plate material including at least a pair of first plate material portions PA1 corresponding to another member connecting part AB and a second plate material portion PA2 that is integrally continuous with the first plate material portions PA1 and corresponding to an arm main body AM.

(2) A second process of forming a cylindrical bush holding part H by performing burring on each of the first plate material portions PA1 of the workpiece P.

(3) A third process of forming the arm main body AM having a back plate part 1 and a pair of winding and bending parts 2 and 3 integrally by press-forming the second plate material portion PA2 of the workpiece P so that both side portions thereof are wound in a cylindrical shape with a central part in a width direction of the second plate material portion PA2 as a base point, and abutting arcuate surfaces 2r and 3r formed on each part of end edges 2e and 3e of both the winding and bending parts 2 and 3 on the bush holding part H side and an arcuate surface 2sr formed on a side edge of a polymerization connecting piece 2s integrated with the winding and bending part 2 against an outer circumferential surface Hr of the bush holding part H on the arm main body AM side.

(4) A fourth process of welding (w1) the arcuate surfaces 2r, 3r, and 2sr of the pair of winding and bending parts 2 and 3 and the polymerization connecting piece 2s to the outer circumferential surface Hr of the bush holding part H on the arm main body AM side, and welding (w2) the polymerization connecting part 2 to an outer surface of the other winding and bending part 3.

According to Patent Document 1, since a high-strength and high-rigidity upper arm A in which another member connecting part AB having the cylindrical bush holding part H is integrated with both end portions AMe of the cylindrical hollow arm main body AM can be manufactured by the above-described manufacturing method at extremely low cost by combining burring and press forming (bending processing) for individual regions R1 to Rn to be formed in the workpiece P, and the upper arm A has a one-piece structure, parts management can be simplified.

CITATION LIST

Patent Document

[Patent Document 1]
Japanese Unexamined Patent Application, First Publication No. 2010-126095

SUMMARY OF THE INVENTION

Problems to be Solved by the Invention

In the above-described conventional manufacturing method, the press forming in the third process and the welding in the fourth process are performed after the cylindrical bush holding part H is formed in the second process. However, an influence of the processing of these post-processes on dimensional accuracy of the cylindrical bush holding part H is not considered at all. That is, it is based on the premise that the post-processing following the formation of the connecting hole does not affect dimensional accuracy of the connecting hole. However, such a premise leaves a problem in practical use.

The present invention has been made in view of the above circumstances, and an objective of the present invention is to provide a manufacturing method and a manufacturing device for a link part in which a link part having a connecting hole with high dimensional accuracy can be obtained.

Means for Solving the Problem

In order to solve the above-described problems and achieve the objective, the present invention employs the following aspects.

(1) A manufacturing method for a link part according to one aspect of the present invention is a method for manufacturing a link part including one end portion having a connecting hole and provided on one side in one direction from an intermediate part which is long in the one direction and has a first side wall and a second side wall each having a pilot hole at least at one end portion and disposed to face each other and a connecting wall connecting one side edge of the first side wall and one side edge of the second side wall, and the other end portion provided on the other side therefrom in the one direction, and includes a reinforcing process of inserting a metal core into the pilot hole, and an O-bending process of O-bending the first side wall and the second side wall so that the other side edge of the first side wall and the other side edge of the second side wall are brought into contact with each other after the reinforcing process.

According to the aspect of the above-described (1), even when an external force is applied to the first side wall and the second side wall in the O-bending process, since the pilot hole is reinforced from the inside in advance by the metal core, deformation of the pilot hole is effectively curbed. Further, as a form of inserting the metal core into the pilot hole, there is "insertion" or "press-fitting." The "insertion" in the specification of the present application refers to a method of inserting the metal core in which an inner shape or an inner diameter of the pilot hole is not made equal to or larger than the original dimension by inserting the metal core. On the other hand, the "press-fitting" in the specification of the present application refers to a method of inserting the metal core in which an inner shape or an inner diameter of the pilot hole is made larger than the original dimension by inserting the metal core. Here, insertion or press-fitting is determined by setting a magnitude relation of an outer shape or an outer diameter of the metal core with respect to an inner shape or an inner diameter of the pilot hole.

When the metal core is, for example, "press-fitted" in the reinforcing process, a tensile force along an edge portion of the pilot hole is applied to the pilot hole by the metal core. Since the pilot hole is reinforced from the inside in advance by the tensile force, deformation of the pilot hole can be more effectively curbed. For example, when the pilot hole is circular, the tensile force serves as a hoop force applied to the pilot hole.

Further, a shape of the pilot hole is not limited only to a circular shape and may be a non-circular shape. Further, the pilot hole is not limited only to one formed by being surrounded by a completely closed circumferential surface, and a portion thereof may be open. Therefore, the pilot hole may be, for example, a semicircular shape that is open. Even when the pilot hole is semicircular, since the pilot hole is reinforced from the inside in advance by the metal core, deformation of the pilot hole is effectively curbed. Further, when the metal core is, for example, "press-fitted" in the reinforcing process, a tensile force along an edge portion of the semicircular pilot hole is applied to the pilot hole by the metal core. Since the pilot hole is reinforced from the inside in advance by the tensile force, deformation of the pilot hole in the post-processing is effectively curbed.

Also, when the pilot hole is circular, the metal core may be a ring-shaped jig or may be a solid columnar jig. The metal core is basically an integral piece but may also be divided into a pair.

Further, the pilot hole may be formed on both the first side wall and the second side wall or may be formed on only one side.

(2) The aspect according to the above-described (1) may further include an axial bending process of axially bending the intermediate part so that the connecting wall forms a concave shape in a view of facing the first side wall by simultaneously applying an external force to both an inner surface of the connecting wall of the intermediate part and an outer circumferential surface of the metal core after the reinforcing process and before the O-bending process.

In a case of the aspect described in the above-described (2), since an external force is simultaneously applied to both the connecting wall and the metal core, the metal core follows the axial bending deformation of the connecting wall without delay. Therefore, since the metal core can also follow deformation of the first side wall and the second side wall that are integrated with the connecting wall, the pilot hole being deformed due to delay in movement of the metal core does not occur.

(3) In the aspect according to the above-described (2), the axial bending may be performed by pressing a pressurizing surface having a linear shape in a side view against the inner surface of the connecting wall in the axial bending process.

In a case of the aspect according to the above-described (3), since the inner surface of the connecting wall is pressurized by the pressurizing surface having a linear shape in a side view, the axial bending can be performed while the inner surface of the connecting wall maintains a linear shape. On the other hand, for example, when the inner surface of the connecting wall is pressurized by a pressurizing surface having a convex curved shape in a side view, since the inner surface of the connecting wall is deformed into a concave curved surface corresponding to the pressurizing surface of the convex curved shape, the first side wall and the second side wall that are continuous with the connecting wall are also pulled by the concave curved surface of the connecting wall. In contrast, according to the present aspect, since a concave curved surface is not generated on the connecting wall, partial pulling applied to a peripheral portion of the pilot hole can be suppressed, and dimensional accuracy of the connecting hole formed by the pilot hole can be further enhanced.

(4) In the aspect according to any one of the above-described (1) to (3), a core sandwiched between the first side wall and the second side wall and sandwiched between the outer circumferential surface of the metal core and the inner surface of the connecting wall may be inserted, before performing the O-bending, into an end portion of the intermediate part in the O-bending process.

In a case of the aspect according to the above-described (4), a distance and a degree of parallelization between the first side wall and the second side wall are kept constant and a distance between the connecting wall and the metal core is kept constant by the core. Therefore, even when an external force for O-bending is applied in the O-bending process, an influence on dimensional accuracy and a position of the pilot hole can be suppressed, and thereby a link part with higher dimensional accuracy can be manufactured.

(5) In the aspect according to any one of the above-described (1) to (4), a diameter ratio calculated by dividing an outer diameter of the metal core by an inner diameter of the pilot hole may be larger than 1.000.

In a case of the aspect according to the above-described (5), the metal core can be press-fitted into the pilot hole.

(6) In the aspect according to the above-described (1), the following may also apply. A buffing process of forming a buffing hole having a burring vertical wall in the pilot hole is performed before the reinforcing process, and the metal core is inserted into the burring hole instead of the pilot hole in the reinforcing process.

Also in a case of the aspect according to the above-described (6), the same operation and effects as in the aspect according to the above-described (1) can be obtained. That is, even when an external force is applied to the first side wall and the second side wall in the O-bending process, since the burring hole is reinforced in advance by the metal core inserted in the reinforcing process, deformation of the burring hole can be effectively curbed.

Further, a shape of the burring hole is not limited only to a circular shape and may be a non-circular shape. Further, the burring hole is not limited only to one formed by being surrounded by a completely closed circumferential surface, and a portion thereof may be open. Therefore, the buffing hole may be, for example, a semicircular shape that is open.

(7) The aspect according to the above-described (6) may further include an axial bending process of axially bending the intermediate part so that the connecting wall forms a concave shape in a view of facing the first side wall by simultaneously applying an external force to both an inner surface of the connecting wall of the intermediate part and an outer circumferential surface of the burring vertical wall with the metal core inserted, after the reinforcing process and before the O-bending process.

Also in a case of the aspect according to the above-described (7), the same operation and effects as in the aspect according to the above-described (2) can be obtained. That is, since an external force is simultaneously applied to both the connecting wall and the buffing vertical wall, the buffing vertical wall and the metal core follow the axial bending deformation of the connecting wall without delay. Therefore, since the burring vertical wall and the metal core can also follow deformation of the first side wall and the second side wall that are integrated with the connecting wall, the buffing hole being deformed due to delay in movement of the metal core does not occur.

(8) In the aspect according to the above-described (7), the axial bending may be performed by pressing a pressurizing surface having a linear shape in a side view against the inner surface of the connecting wall in the axial bending process.

Also in a case of the aspect according to the above-described (8), the same operation and effects as in the aspect according to the above-described (3) can be obtained. Therefore, according to the present aspect, since a concave curved surface is not generated on the connecting wall, deformation of the burring hole can be further curbed, and dimensional accuracy of the connecting hole formed by the buffing hole can be further enhanced.

(9) In the aspect according to any one of the above-described (6) to (8), a core sandwiched between the first side wall and the second side wall and sandwiched between the outer circumferential surface of the burring vertical wall and the inner surface of the connecting wall may be inserted, before performing the O-bending, into the one end portion of the intermediate part in the O-bending process.

Also in a case of the aspect according to the above-described (9), the same operation and effects as in the aspect according to the above-described (4) can be obtained. That is, a distance and a degree of parallelization between the first side wall and the second side wall are kept constant and a distance between the connecting wall and the burring vertical wall is kept constant by the core. Therefore, even when an external force for O-bending is applied in the O-bending process, an influence on dimensional accuracy and a position of the burring hole can be suppressed, and thereby a link part with higher dimensional accuracy can be manufactured.

(10) In the aspect according to any one of the above-described (6) to (9), a diameter ratio calculated by dividing an outer diameter of the metal core by an inner diameter of the buffing hole may be larger than 1.000.

In a case of the aspect according to the above-described (10), the metal core can be press-fitted into the burring hole.

(11) In the aspect according to the above-described (1), the following may be employed: the method further includes an axial bending process of axially bending the intermediate part, after the reinforcing process and before the O-bending process, so that the connecting wall forms a concave shape in a view of facing the first side wall by applying an external force to a second end portion in a state in which the metal core inserted into the pilot hole is fixed at its regular position and an arbitrary position on the connecting wall between a first end portion serving as one end portion and the second end portion serving as the other end portion of the link part is supported.

In a case of the aspect according to the above-described (11), even while the intermediate part is axially bent, a shape of the pilot hole is always maintained by the inserted metal core.

(12) In the aspect according to the above-described (11), the following may be employed. A burring process of forming a burring hole having a burring vertical wall in the pilot hole is performed before the reinforcing process, and the metal core is inserted into the burring hole instead of the pilot hole in the reinforcing process.

In a case of the aspect according to the above-described (12), even while the intermediate part is axially bent, a shape of the burring hole is always maintained by the inserted metal core.

(13) In the aspect according to any one of the above-described (1) to (12), a material preparation process of preparing a flat plate material having a portion serving as the first side wall, a portion serving as the second side wall, and a portion serving as the connecting wall, and a U-bending process of bending the flat plate material so that the portion serving as the first side wall and the portion serving as the second side wall face each other with the portion serving as the connecting wall as a boundary may be performed before the reinforcing process.

In a case of the aspect according to the above-described (13), the intermediate part having the pilot hole can be obtained by the U-bending process after the material preparation process. Further, the burring vertical wall that partitions the burring hole may be formed by performing buffing on the pilot hole before the U-bending process.

(14) In the aspect according to any one of the above-described (1) to (13), the metal core may be used as a part of the link part, and an opening of the metal core may be used as the connecting hole.

In a case of the aspect according to the above-described (14), a process of removing the metal core from the link part, and a post-process of reinforcing the pilot hole or the buffing hole of the link part are unnecessary. Therefore, productivity can be further enhanced.

(15) A manufacturing device for a link part according to one aspect of the present invention is a device for manufacturing a link part including one end portion having a connecting hole and provided on one side in one direction from an intermediate part which is long in the one direction and has a first side wall and a second side wall each having a pilot hole at least at one end portion and disposed to face each other and a connecting wall connecting one side edge of the first side wall and one side edge of the second side wall, and the other end portion provided on the other side therefrom in the one direction, and includes a metal core inserted into the pilot hole, a first die which receives the intermediate part and has a first recessed surface having a shape which aligns with an outer shape of the link part, a second die which accommodates the intermediate part together with the first die and has a second recessed surface which comes into contact with both the other side edge of the first side wall and the other side edge of the second side wall to bring them closer to each other, and a first drive mechanism which brings relative positions between the first die and the second die closer to and further away from each other.

According to the aspect of the above-described (15), first, the metal core is inserted into the pilot hole. Thereafter, the intermediate part in which the pilot hole is reinforced by the metal core is placed as it is on the first recessed surface of the first die. Thereafter, relative positions between the first die and the second die are brought closer to each other by the first drive mechanism to accommodate the intermediate part, and thereby both are aligned. At that time, the second recessed surface of the second die comes into contact with both the other side edge of the first side wall and the other side edge of the second side wall, and both are brought closer to each other and aligned. The link part in which a cross section perpendicular to a longitudinal direction has a closed cross-sectional shape can be obtained by the O-bending. Moreover, the pilot hole is continuously reinforced by the metal core even during the O-bending. Therefore, even when an external force is applied to the first side wall and the second side wall for the O-bending, since the pilot hole is reinforced in advance by the metal core inserted beforehand, deformation of the pilot hole can be effectively curbed.

(16) The aspect according to the above-described (15) may further include a third die including a convex first arcuate surface configured to be in contact with an outer surface of the connecting wall, a first side surface configured to be in contact with an outer surface of the first side wall, and a second side surface configured to be in contact with an outer surface of the second side wall, a fourth die including a concave second arcuate surface configured to be in contact with an inner surface of the connecting wall, a third side surface configured to be in contact with an inner surface of the first side wall, a fourth side surface configured to be in contact with an inner surface of the second side wall, and a metal core holding surface configured to be in contact with an outer circumferential surface of the metal core, and a second drive mechanism which brings relative positions between the third die and the fourth die closer to and further away from each other.

In a case of the aspect according to the above-described (16), the intermediate part is disposed in the third die so that the outer surface of the connecting wall is in contact with the first arcuate surface, the outer surface of the first side wall is in contact with the first side surface, and the outer surface of the second side wall is in contact with the second side surface. Then, relative positions between the third die and the fourth die are brought closer by a driving force of the second drive mechanism. As a result, the second arcuate surface comes into contact with the inner surface of the connecting wall, the third side surface is in sliding contact with the inner surface of the first side wall, the fourth side surface is in sliding contact with the inner surface of the second side wall, and then the metal core holding surface abuts against the outer circumferential surface of the metal core. When the relative positions between the third die and the fourth die are further brought closer to each other, the connecting wall is bent in accordance with shapes of the first arcuate surface and the second arcuate surface. Then, the first side wall and the second side wall are also bent as the connecting wall is deformed. In this way, the axial bending of the intermediate part is completed.

During the axial bending, since a force of the second drive mechanism can be simultaneously applied to both the connecting wall and the metal core, the metal core can be made to follow the deformation operation of the axial bending of the connecting wall without delay. Therefore, since the metal core also follows deformation of the first side wall and the second side wall that are integrated with the connecting wall, the pilot hole being deformed due to delay in movement of the metal core does not occur.

(17) In the aspect according to the above-described (16), the following may also apply. A pressure receiving part of the first arcuate surface which receives a portion of the intermediate part serving as the one end portion of the link part is linear when viewed in a longitudinal section including a direction in which the first arcuate surface extends, and a first pressurizing part of the second arcuate surface facing the pressure receiving part via the connecting wall is linear in the longitudinal sectional view.

In a case of the aspect according to the above-described (17), since the portion serving as one end portion of the link part in the connecting wall of the intermediate part is sandwiched between the pressure receiving part and the first pressurizing part that are linear to each other in a longitudinal sectional view, the axial bending can be performed while the inner surface of the connecting wall maintains a linear shape. Therefore, since a concave curved surface is not generated on the connecting wall, a periphery of the pilot hole being partially pulled and deformed can be further curbed. Therefore, dimensional accuracy of the connecting hole formed by the pilot hole can be further enhanced.

(18) In the aspect according to the above-described (17), a second pressurizing part of the second recessed surface which pressurizes a portion of the intermediate part serving as the one end portion of the link part may be linear when viewed in a longitudinal section including a direction in which the second recessed surface extends.

In a case of the aspect according to the above-described (18), as a result of performing the O-bending of aligning the other side edge of the first side wall and the other side edge of the second side wall with each other by the second recessed surface of the second die, the aligned portion follows a shape of the second recessed surface and forms a linear shape in a side view. Thereby, even when an inner side of the aligned portion is pushed by, for example, the core, since a concave curved surface is not generated, the periphery of the pilot hole being partially pulled and deformed can be further curbed. Therefore, dimensional accuracy of the connecting hole formed by the pilot hole can be further enhanced.

(19) The aspect according to any one of the above-described (15) to (18) may further include a core inserted between the first side wall and the second side wall, and between the outer circumferential surface of the metal core and the inner surface of the connecting wall, and a third drive mechanism which inserts and removes the core with respect to the first die and the second die.

In a case of the aspect according to the above-described (19), the core can be inserted between the first side wall and the second side wall and between the outer circumferential surface of the metal core and the inner surface of the connecting wall by receiving a driving force of the third drive mechanism. Therefore, a distance and a degree of parallelization between the first side wall and the second side wall are kept constant and a distance between the connecting wall and the metal core is kept constant by the core. Therefore, even when an external force for O-bending is applied to the first side wall and the second side wall, since an influence on dimensional accuracy and a position of the pilot hole can be suppressed, a link part with higher dimensional accuracy can be manufactured.

(20) In the aspect according to the above-described (15), the following may also apply. A burring machine for forming a burring hole having a burring vertical wall in the pilot hole of the intermediate part is further provided, and the metal core is inserted into the burring hole.

Also in a case of the aspect according to the above-described (20), the same operation and effects as in the aspect according to the above-described (15) can be obtained. That is, a pair of burring holes are continuously reinforced by the metal core even during the O-bending. Therefore, even when an external force is applied to the first side wall and the second side wall for the O-bending, since the burring holes are reinforced in advance by the metal core inserted beforehand, deformation of the burring holes can be effectively curbed.

(21) The aspect according to the above-described (20) may further include a third die including a convex first arcuate surface configured to be in contact with an outer surface of the connecting wall, a first side surface configured to be in contact with an outer surface of the first side wall, and a second side surface configured to be in contact with an outer surface of the second side wall, a fourth die including a concave second arcuate surface configured to be in contact with an inner surface of the connecting wall, a third side surface configured to be in contact with an inner surface of the first side wall, a fourth side surface configured to be in contact with an inner surface of the second side wall, and a metal core holding surface configured to abut against an outer circumferential surface of the metal core via the buffing vertical wall, and a second drive mechanism which brings relative positions between the third die and the fourth die closer to and further away from each other.

Also in a case of the aspect according to the above-described (21), the same operation and effects as in the aspect according to the above-described (16) can be obtained. The intermediate part is disposed in the third die so that the outer surface of the connecting wall is in contact with the first arcuate surface, the outer surface of the first side wall is in contact with the first side surface, and the outer surface of the second side wall is in contact with the second side surface. Then, relative positions between the third die and the fourth die are brought closer by a driving force of the second drive mechanism. As a result, the second arcuate surface comes into contact with the inner surface of the connecting wall, the third side surface is in sliding contact with the inner surface of the first side wall, the fourth side surface is in sliding contact with the inner surface of the second side wall, and then the metal core holding surface abuts against an outer circumferential surface of the burring vertical wall. When the relative positions between the third die and the fourth die are further brought closer to each other, the connecting wall is bent in accordance with shapes of the first arcuate surface and the second arcuate surface. Then, the first side wall and the second side wall are also bent as the connecting wall is deformed. In this way, the axial bending of the intermediate part is completed.

During the axial bending, since a force of the second drive mechanism can be simultaneously applied to both the connecting wall and the burring vertical wall, the burring vertical wall can be made to follow the deformation operation of the axial bending of the connecting wall without delay. Therefore, since the burring vertical wall also follows the first side wall and the second side wall that perform deformation operations by being integrated with the connecting wall, the burring vertical wall is not deformed by the metal core.

(22) In the aspect according to the above-described (21), the following may also apply. A pressure receiving part of the first arcuate surface which receives a portion of the intermediate part serving as the one end portion of the link part is linear when viewed in a longitudinal section including a direction in which the first arcuate surface extends, and a first pressurizing part of the second arcuate surface facing the pressure receiving part via the connecting wall is linear in the longitudinal sectional view.

Also in a case of the aspect according to the above-described (22), the same operation and effects as in the aspect according to the above-described (17) can be obtained. Therefore, according to the present aspect, since a concave curved surface is not generated on the connecting wall, deformation of the burring hole can be curbed, and dimensional accuracy of the connecting hole formed by the burring hole can be further enhanced.

(23) In the aspect according to the above-described (22), a second pressurizing part of the second recessed surface which pressurizes a portion of the intermediate part serving as the one end portion of the link part may be linear when viewed in a longitudinal section including a direction in which the second recessed surface extends.

Also in a case of the aspect according to the above-described (23), the same operation and effects as in the aspect according to the above-described (18) can be obtained. Therefore, according to the present aspect, dimensional accuracy of the connecting hole formed by the pilot hole can be further enhanced.

(24) The aspect according to any one of the above-described (20) to (23) may further include a core inserted between the first side wall and the second side wall, and between an outer circumferential surface of the burring vertical wall and the inner surface of the connecting wall, and a third drive mechanism which inserts and removes the core with respect to the first die and the second die.

Also in a case of the aspect according to the above-described (24), the same operation and effects as in the aspect according to the above-described (19) can be obtained. Therefore, according to the present aspect, even when an external force for O-bending is applied to the first side wall and the second side wall, an influence on dimensional accuracy and a position of the burring hole can be suppressed, and thereby a link part with higher dimensional accuracy can be manufactured.

(25) The aspect according to the above-described (15) may further include a fifth die including a third arcuate surface configured to be in contact with an outer surface of the connecting wall and having a convex shape in a longitudinal sectional view, a fifth side surface configured to be in contact with an outer surface of the first side wall, a sixth side surface configured to be in contact with an outer surface of the second side wall, and a pair of through holes coaxially penetrating the fifth side surface and the sixth side surface, a sixth die including a fourth arcuate surface configured to be in contact with an inner surface of the connecting wall and having a concave shape in a longitudinal sectional view, a seventh side surface configured to be in contact with an inner surface of the first side wall, and an eighth side surface configured to be in contact with an inner surface of the second side wall, a fourth drive mechanism which brings relative positions between the fifth die and the sixth die closer to and further away from each other, and a fifth drive mechanism which inserts and removes the metal core with respect to the pair of through holes.

In a case of the aspect according to the above-described (25), first, an intermediate part is disposed in the fifth die so that the outer surface of the connecting wall is in contact with the third arcuate surface, the outer surface of the first side wall is in contact with the fifth side surface, and the outer surface of the second side wall is in contact with the sixth side surface. Next, the metal core is inserted into a pair of pilot holes of the intermediate part to penetrate all of one of the pair of through holes, one of the pair of pilot holes of the intermediate part, the other of the pair of pilot holes of the intermediate part, and the other of the pair of through holes. Thereby, a state is brought about in which a connecting part is fixed at its regular position in the fifth die by the metal core at a position between a first end portion serving as one end portion and a second end portion serving as the other end portion in the intermediate part, and a part of the connecting wall between the first end portion and the second end portion abuts against a convex third arcuate surface and is supported thereby. With the intermediate part supported at two points in the fifth die in this way, relative positions between the fifth die and the sixth die are brought closer by a driving force of the fifth drive mechanism. Then, the fourth arcuate surface comes into contact with the inner surface of the connecting wall on the second end portion side and pushes it down. As a result, the intermediate part is axially bent with a part of the outer surface of the connecting wall supported by the third arcuate surface as a fulcrum. Even when the axial bending is performed, since the pair of pilot holes are reinforced by the metal core inserted in advance, an influence on dimensional accuracy and a position thereof can be suppressed.

(26) In the aspect according to the above-described (25), the following configuration may also be employed. The metal core includes a first part metal core inserted into and removed from the through hole of the fifth side surface, and a second part metal core inserted into and removed from the through hole of the sixth side surface and coaxial with the first part metal core, and the fifth drive mechanism includes a first drive unit which inserts and removes the first part metal core into and from the through hole of the fifth side surface, and a second drive unit which inserts and removes the second part metal core into and from the through hole of the sixth side surface.

In a case of the aspect according to the above-described (26), the intermediate part is disposed in the fifth die so that one of the pair of through holes, one of the pair of pilot holes of the intermediate part, the other of the pair of pilot holes of the intermediate part, and the other of the pair of through holes are all coaxial. Next, the first part metal core is inserted into one of the pair of pilot holes of the intermediate part through one of the pair of through holes by the first drive unit. Similarly, the second part metal core is inserted into the other of the pair of pilot holes of the intermediate part through the other of the pair of through holes by the second drive unit. Insertion of the first part metal core and insertion of the second part metal core may be performed at the same time, or either one may be performed first and the other may be performed thereafter. With the processes described above, the pair of pilot holes are reinforced by the first part metal core and the second part metal core.

(27) The aspect according to any one of the above-described (15) to (26) may further include a seventh die including a recessed groove which aligns with a portion serving as the connecting wall in a flat plate material having a portion serving as the first side wall, a portion serving as the second side wall, and a portion serving as the connecting wall, an eighth die inserted into and removed from the recessed groove with the flat plate material sandwiched therebetween, and a third drive mechanism which brings relative positions between the seventh die and the eighth die closer to and further away from each other.

In a case of the aspect according to the above-described (27), the flat plate material is placed on the seventh die so that the portion serving as the connecting wall is overlapped on the recessed groove. Then, the seventh die and the eighth die are brought relatively closer to each other by a driving force of the third drive mechanism. As a result, the flat plate material is U-bent by the eighth die being inserted into the recessed groove. As a result, the intermediate part having the pilot hole or the burring hole can be obtained.

Effects of the Invention

According to the manufacturing method and the manufacturing device for a link part of the above-described aspects, a link part having a connecting hole with high dimensional accuracy can be obtained.

EMBODIMENTS FOR IMPLEMENTING THE INVENTION

First Embodiment

A first embodiment of a manufacturing method and a manufacturing device for a link part of the present invention will be described below with reference to the drawings. First, a link part L manufactured by the present embodiment will be described below with reference to FIG. 1.

Figure 1:
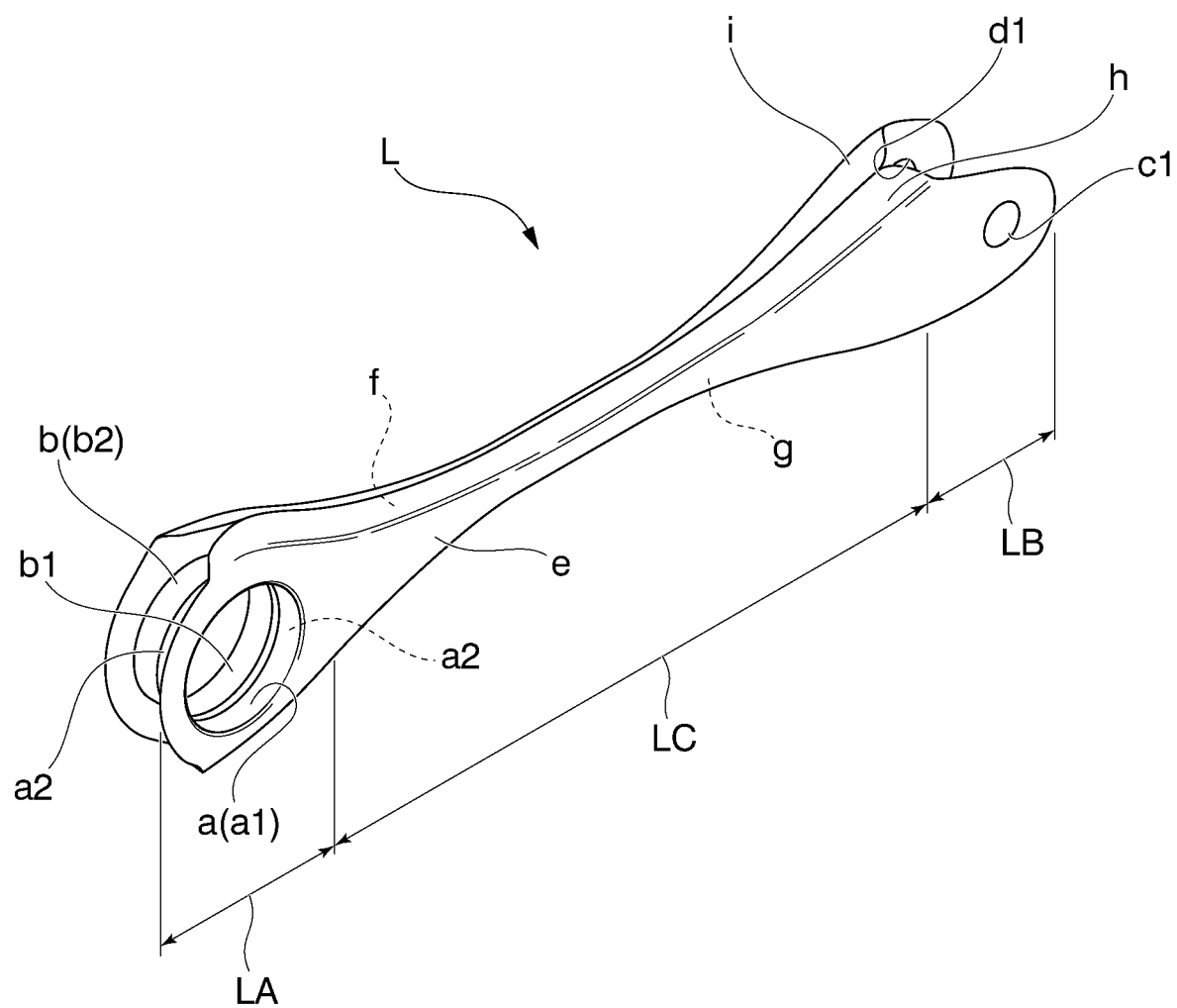
FIG. 1 is a perspective view of a link part manufactured by a manufacturing method and a manufacturing device for a link part according to a first embodiment of the present invention.

As shown in FIG. 1, the link part L is long in an axial direction thereof and has a closed cross-sectional shape in a cross section perpendicular to the axis at any position in the axial direction. The link part L includes one end portion LA provided on one side in the axial direction, the other end portion LB provided on the other side in the axial direction, and a central portion LC connecting between the one end portion LA and the other end portion LB.

The one end portion LA has a pair of burring holes a1 and b1. These burring holes a1 and b1 are circular through holes having the same inner diameter dimension as each other and partitioned by burring vertical walls a and b which are each formed inward. The burring holes a1 and b1 are disposed coaxially with and parallel to each other, and central axes thereof are perpendicular to the axial direction of the link part L in a plan view. The burring vertical walls a and b each have an annular shape having a substantially constant width dimension, and inner circumferential surfaces thereof form the burring holes a1 and b1 having a substantially constant width dimension in a circumferential direction. Outer circumferential surfaces a2 and b2 of the burring vertical walls a and b also have an annular shape, and width dimensions thereof are substantially constant in the circumferential direction. These outer circumferential surfaces a2 and b2 are also disposed coaxially with and parallel to each other and have the same outer diameter dimension. The burring holes a1 and b1 are connected to other parts (not shown in the drawings) via a shaft body (not shown in the drawings). Further, the burring vertical wall may be referred to as a flange of the burring hole but is referred to as a burring vertical wall in the present invention.

The other end portion LB has a pair of through holes c1 and d1. These through holes c1 and d1 are circular through holes having the same inner diameter dimension as each other. The through holes c1 and d1 are disposed coaxially with and parallel to each other, and central axes thereof are perpendicular to the axial direction of the link part L in a plan view. The through holes c1 and d1 are connected to other parts via a shaft body (not shown in the drawings). A pair of burring holes may be formed instead of the through holes c1 and d1.

The central portion LC has a smallest external dimension at a center position in the axial direction, and the external dimension gradually increases toward the one end portion LA. Similarly, the external dimension of the central portion LC gradually increases toward the other end portion LB.

Details of a manufacturing method for the link part L will be described later, but first, one flat plate is die-cut to obtain a flat plate material having a first pilot hole (pilot hole) and a second pilot hole (pilot hole). Then, as needed, the first pilot hole and the second pilot hole are subjected to burring to form the burring holes a1 and b1, and then the flat plate material is U-bent so that an intermediate part having a substantially U-shaped cross-sectional shape is obtained. Next, a metal core is made to pass through the intermediate part to reinforce the burring holes a1 and b1 (the first pilot hole and the second pilot hole when burring is not performed) in advance. Thereafter, the intermediate part is axially bent so that it is warped with respect to a longitudinal direction and is finally O-bent to obtain a closed cross-sectional shape. As a result, the link part L shown in FIG. 1 is obtained.

As described above, since the link part L is obtained by die-cutting one flat plate and performing bending processing, wall parts thereof are integrally continuous with each other. Specifically, the link part L includes a first side wall part e and a second side wall part f facing each other, a bottom wall part g connecting between lower end edges of the first side wall part e and the second side wall part f, a first upper wall part h and a second upper wall part i connecting between upper end edges of the first side wall part e and the second side wall part f. Then, the first upper wall part h is integrally continuous with the first side wall part e, the first side wall part e is integrally continuous with the bottom wall part g, the bottom wall part g is integrally continuous with the second side wall part f, and the second side wall part f is integrally continuous with the second upper wall part i. Then, the upper end edge of the first upper wall part h and the upper end edge of the second upper wall part i are in contact with each other in an axial direction of the link part L. This connecting portion may be left abutted (that is, left in contact with each other) or may be joined by welding. As the welding in this case, arc welding or laser welding can be appropriately used. Further, when the welding is not performed, it is possible to provide flexibility in twisting around the axis while maintaining rigidity in the axial direction. The link part L has a closed cross-sectional shape in a cross section perpendicular to the axis at any position in the axial direction except for both end edges thereof.

In order to manufacture the above-described link part L, a manufacturing device for the link part according to the present embodiment includes a die-cutting machine for die-cutting a flat plate to obtain a flat plate material, a burring machine that performs burring on the first pilot hole and second pilot hole of the flat plate material, a U-bending machine for U-bending the flat plate material to obtain an intermediate part, a metal core inserting and removing machine that inserts a metal core into the intermediate part, an axial bending machine that axially bends the intermediate part, and an O-bending machine for O-bending the intermediate part.

Although not shown in the drawings, the die-cutting machine includes a die having a recessed part having the same shape as a flat plate material P shown in FIG. 2(a), a punch having a protruding part having the same shape as the flat plate material P, and a punch drive mechanism that brings the punch and the die relatively closer to and further away from each other. According to the die-cutting machine, in a state in which the flat plate is overlapped on the recessed part, the die and the punch are brought close to each other by the punch drive mechanism, and the protruding part of the punch punches the flat plate to form an outer shape of the flat plate material P.

Although not shown in the drawings, the burring machine includes a die having a recessed part having an inner diameter dimension larger than that of the first pilot hole and the second pilot hole formed by the die-cutting machine, a punch inserted through the recessed part, and a punch drive mechanism that brings the punch and the die relatively closer to and further away from each other. According to the burring machine, after the flat plate material P is placed on the die, when the punch passes through the first pilot hole and the second pilot hole by the punch drive mechanism, the flat plate material P having the buffing holes a1 and b1 shown in FIG. 2(a) can be obtained. The flat plate material P includes a portion P1 serving as the bottom wall part g (connecting wall), a portion P2 serving as the first side wall part e and the first upper wall part h (first side wall), and a portion P3 serving as the second side wall part f and the second upper wall part i (second side wall).

Figure 2:
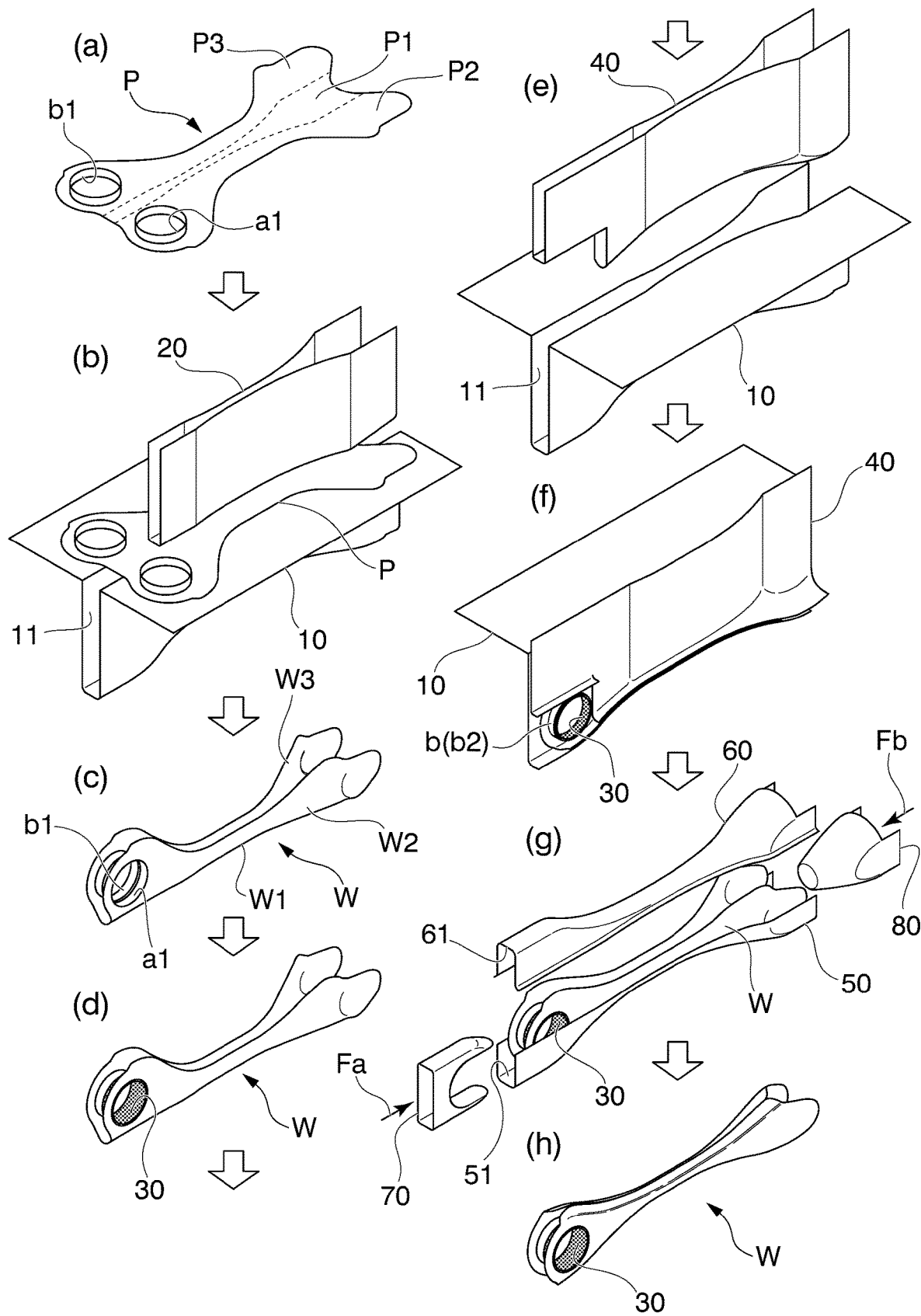
FIG. 2 is a view showing the manufacturing method for the link part, in which each process proceeds in order of (a) to (h).
Figure 3:
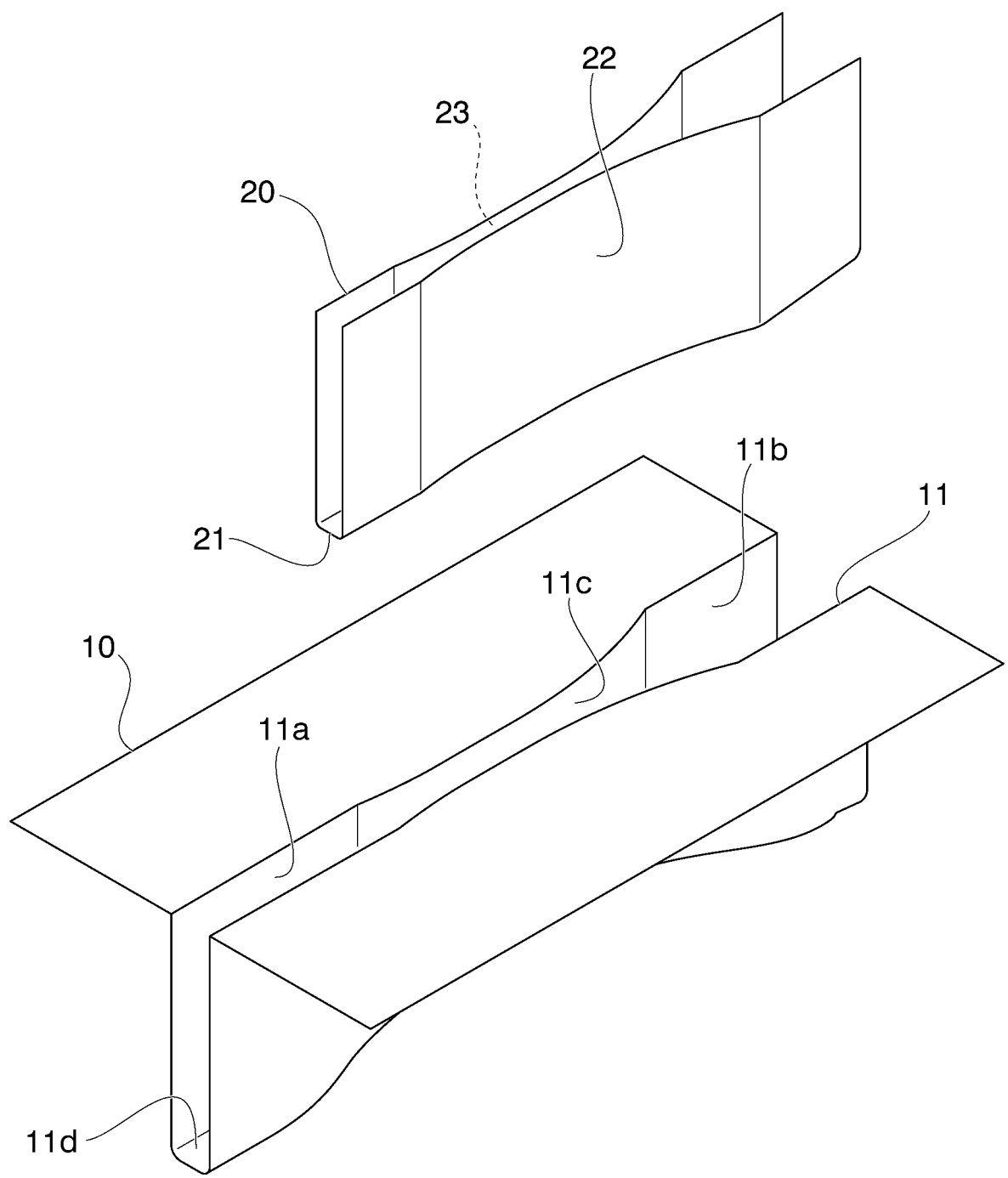
FIG. 3 is a perspective view showing a die used in a U-bending process shown in FIGS. 2(b) and 2(c) in the manufacturing device for a link part used in the manufacturing method for the link part.

As shown in FIGS. 2(b) and 3, the U-bending machine includes a die 10 having a recessed groove 11 corresponding to the portion P1, a punch 20 inserted into and removed from the recessed groove 11, and a punch drive mechanism (not shown in the drawings) that brings the die 10 and the punch 20 relatively closer to and further away from each other.

The recessed groove 11 shown in FIG. 3 has a shape that substantially aligns with an outer shape of the link L in a plan view. That is, the recessed groove 11 includes one end portion 11a having a groove width dimension corresponding to the one end portion LA, the other end portion 11b having a groove width dimension corresponding to the other end portion LB, and a central portion 11c having a groove width dimension corresponding to the central portion LC. The groove width dimensions of the one end portion 11a and the other end portion 11b are each larger than the groove width dimension of the central portion 11c. Also, the groove width dimension of the central portion 11c is the smallest at a center position in a longitudinal direction thereof, and gradually increases toward the one end portion 11a and the other end portion 11b. The recessed groove 11 has a sufficient depth to bend the portion P1 and the portion P2 until they are parallel to each other.

As shown in FIG. 3, the punch 20 includes a pressurizing surface 21 that pressurizes the portion P1 from above, a side surface 22 that is in contact with the portion P2, and a side surface 23 that is in contact with the portion P3 when the flat plate material P is U-bent. The pressurizing surface 21 has the same shape as the recessed groove 11 in a plan view and has a dimension slightly smaller than that of the recessed groove 11. The side surfaces 22 and 23 have concavo-convex shapes corresponding to the one end portion 11a, the central portion 11c, and the other end portion 11b of the recessed groove 11 in a plan view.

According to the U-bending machine, as shown in FIG. 2(b), the flat plate material P is placed on the die 10, and the flat plate material P is pushed into the recessed groove 11 by the punch 20, and thereby the portion P2 and the portion P3 are bent to face each other with the portion P1 as a boundary. Then, when the flat plate material P bent in this way is taken out from the recessed groove 11 of the die 10, an intermediate part W shown in FIG. 2(c) can be obtained.

As shown in FIG. 2(c), the intermediate part W includes a first side wall W2 having a buffing hole a1, a second side wall W3 having a burring hole b1 and disposed to face the first side wall W2, and a connecting wall W1 connecting a lower edge (one side edge) of the first side wall W2 and a lower edge (one side edge) of the second side wall W3. The intermediate part W is long in one direction. The connecting wall W1 has a linear shape in a side view. A distance between the first side wall W2 and the second side wall W3 is the smallest at a center position and gradually increases from the center position toward both end positions when viewed in a longitudinal direction of the intermediate part W. The buffing holes a1 and b1 are disposed to face each other to be coaxial with each other.

The metal core inserting and removing machine includes a first holding mechanism (not shown in the drawings) for holding the intermediate part W after the U bending shown in FIG. 2(c), a metal core 30 shown in FIG. 2(d), a second holding mechanism (not shown in the drawings) for coaxially holding the metal core 30, and a drive mechanism (not shown in the drawings) for driving the holding mechanism.

The metal core 30 is an annular body having a predetermined width dimension, and may employ a configuration having an outer circumferential surface having an outer diameter dimension slightly larger than those of the burring holes a1 and b1 of the intermediate part W, and an inner circumferential surface held by the first holding mechanism. Further, the metal core 30 of the present embodiment is removed in a final process of obtaining the link part L, but the metal core 30 may remain press fitted as a part of the link part L. On the other hand, when the metal core 30 is not used as a part of the link part L, the metal core 30 may be a columnar body or the like instead of an annular body.

According to the metal core inserting and removing machine, first, the intermediate part W is fixed to the first holding mechanism. Next, after the metal core 30 is attached to the second holding mechanism, the second holding mechanism is moved by a driving force of the drive mechanism, and the metal core 30 is coaxially inserted into the burring holes a1 and b1 of the intermediate part W. Thereby, as shown in FIG. 2(d), the metal core 30 is fixed to the intermediate part W, and reinforcement of the burring holes a1 and b1 is completed.

The metal core may be a ring-shaped jig or may be a solid columnar jig. A metal core for each of two separated burring holes may be used, but in order to improve coaxiality of the burring holes, a metal core in which two metal cores are integrated (one metal core as a result of the integration) is preferably used.

As shown in FIGS. 2(e) and 2(f), the axial bending machine includes the die 10 having the recessed groove 11 corresponding to the portion P1, a punch 40 inserted into and removed from the recessed groove 11, and a punch drive mechanism (not shown in the drawings) for inserting and removing the punch 40 with respect to die 10.

Further, in the present embodiment, the die 10 (FIG. 3) of the U-bending machine is concurrently used as a die for holding and fixing the intermediate part W, but the present invention is not limited to this form and another die may be exclusively used for the axial bending machine. On the other hand, when the die 10 is concurrently used and used for the U bending (processes (b) and (c) of FIG. 2), the intermediate part W is not pushed downward until it reaches a bottom surface of the recessed groove 11, but when it is used for the axial bending (processes (e) and (f) of FIG. 2), the intermediate part W is pushed downward until it reaches the bottom surface of the recessed groove 11.

Also, the punch drive mechanism of the axial bending machine shown in FIG. 2(e) and the punch drive mechanism of the U-bending machine shown in FIG. 2(b) may be concurrently used for both or may be provided exclusively for each of them.

Figure 5:
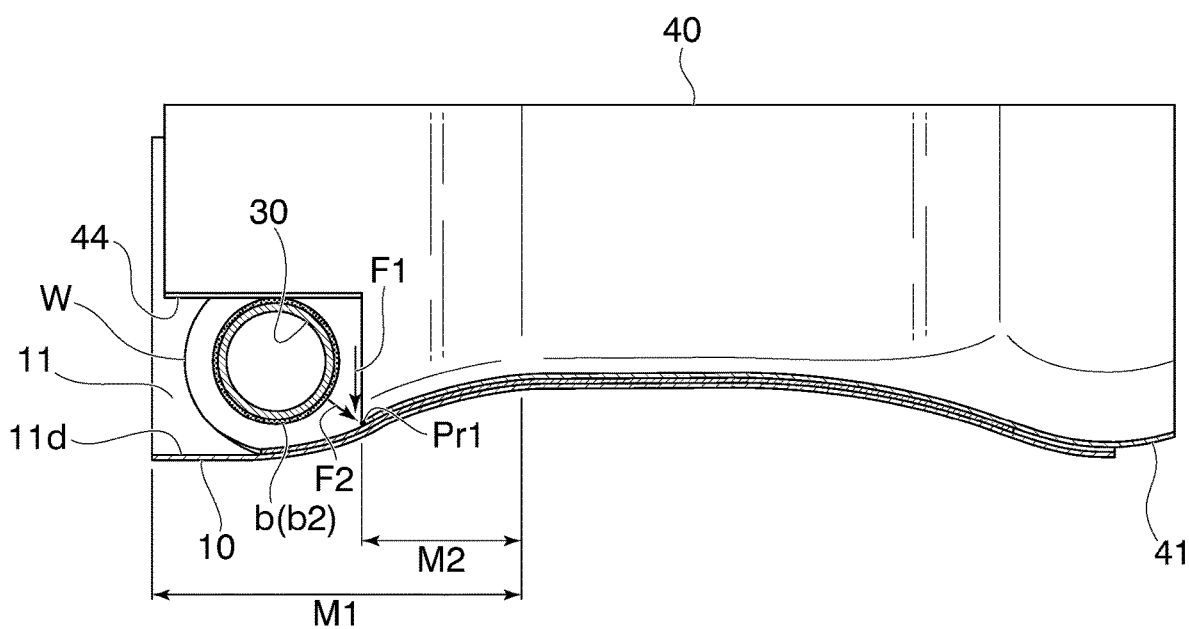
FIG. 5 is a view showing a die of FIG. 4 and is a longitudinal sectional view facing the inside in a cross section of FIG. 2(f).

As shown in FIG. 5, a bottom surface 11d of the recessed groove 11 has a convex surface that is highest at a center position in an extension direction and is gradually lowered from the center position toward both end positions in a longitudinal sectional view in the extension direction. A shape of the bottom surface 11d aligns with an outer shape of a bottom portion of the link part L. That is, a bottom surface width dimension of the positions corresponding to the one end portion 11a and the other end portion 11b shown in FIG. 3 is larger than a bottom surface width dimension of the position corresponding to the central portion 11c. Also, the bottom surface width dimension of the position corresponding to the central portion 11c is the smallest at the center position in the longitudinal direction and gradually increases toward the positions corresponding to the one end portion 11a and the other end portion 11b.

Figure 4:
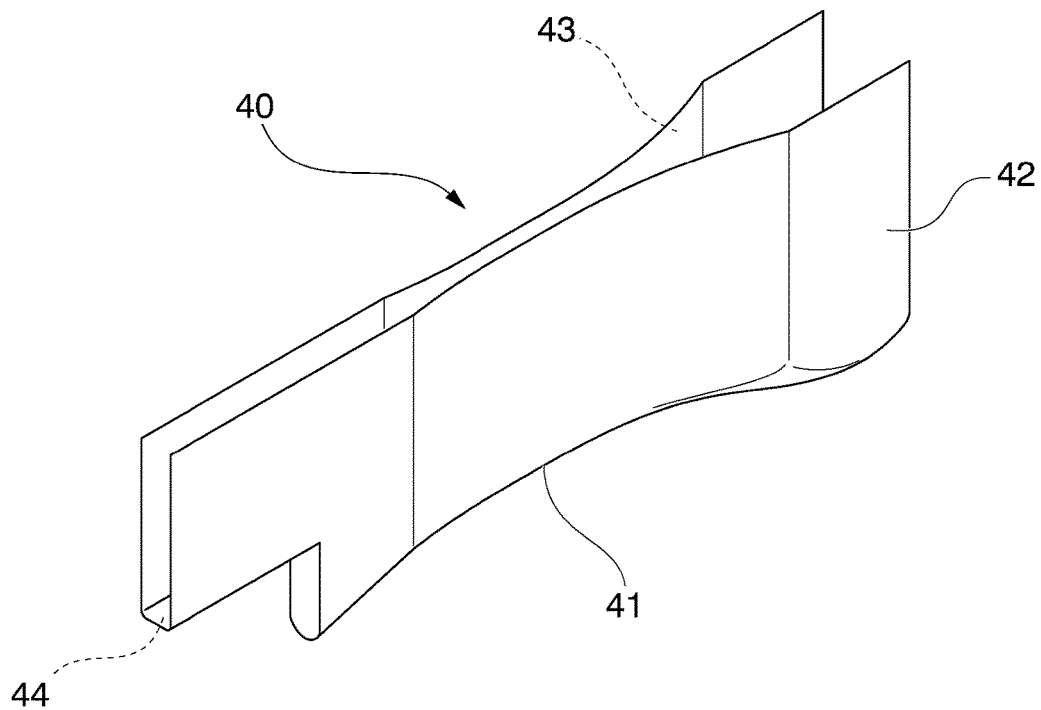
FIG. 4 is a perspective view showing a die used in an axial bending process shown in FIGS. 2(e) and 2(f) in the manufacturing device for a link part used in the manufacturing method for the link part.

As shown in FIG. 4, the punch 40 includes a pressurizing surface 41 that pressurizes an inner surface of the connecting wall W1 from above, a side surface 42 that is in sliding contact with an inner surface of the first side wall W2, a side surface 43 that is in sliding contact with an inner surface of the second side wall W3, and a holding surface 44 that suppresses both the outer circumferential surface a2 of the burring vertical wall a and the outer circumferential surface b2 of the burring vertical wall b when the intermediate part W is axially bent.

The pressurizing surface 41 has a shape corresponding to the bottom surface 11d of the recessed groove 11. That is, as shown in FIG. 5, the pressurizing surface 41 has a concave surface that is highest at a center position in the extension direction and is gradually lowered from the center position toward both end positions in a longitudinal sectional view in the extension direction. Then, the pressurizing surface 41 is formed to avoid positions of the burring vertical walls a and b to avoid interference with the burring vertical walls a and b. A shape of the pressurizing surface 41 in a bottom view is such that a bottom surface width dimension is the smallest at a center position in the longitudinal direction and gradually increases toward both end positions in the longitudinal direction when the pressurizing surface 41 is viewed in a longitudinal direction thereof.

As shown in FIG. 5, the holding surface 44 has a linear shape in a side view, and a width dimension thereof is constant at any position in the longitudinal direction. The holding surface 44 is disposed at a position higher than the pressurizing surface 41 to come into contact with the outer circumferential surfaces a2 and b2 of the burring vertical wall a and the burring vertical wall b. That is, a level difference is provided between the holding surface 44 and the pressurizing surface 41 to avoid the burring vertical wall a and the burring vertical wall b.

The side surfaces 42 and 43 have a concavo-convex shape corresponding to the one end portion 11a, the central portion 11c, and the other end portion 11b of the recessed groove 11 in a plan view. A distance between the side surfaces 42 and 43 in a plan view is the smallest at a center position in the longitudinal direction of the punch 40 and gradually increases toward both end positions in the longitudinal direction. The side surfaces 42 and 43 are parallel to each other at both end positions in the longitudinal direction.

According to the axial bending machine having the above-described configuration, first, the intermediate part W is disposed to be inserted into the recessed groove 11 of the die 10 in a state of die opening as shown in FIG. 2(e). Then, the punch 40 is pushed downward by the punch drive mechanism, and the pressurizing surface 41 pressurizes the inner surface of the connecting wall W1 of the intermediate part W. At that time, simultaneously, the holding surface 44 also pushes down the outer circumferential surfaces a2 and b2 of the burring vertical walls a and b with the metal core 30 inserted. In a case in which there is no holding surface 44, the metal core 30 cannot follow a deformation operation (downward operation) of the connecting wall W1 due to its friction with an inner side surface of the recessed groove 11, and as a result, there is a likelihood that the metal core 30 will apply an unnecessary force to the burring holes a1 and b1. On the other hand, since the present embodiment has the holding surface 44, there is no likelihood of that.

Although the axial bending processing is performed as described above, since the O-bending processing has not yet been performed, upper end edges of the first side wall W2 and the second side wall W3 are not joined to each other.

Figure 6:
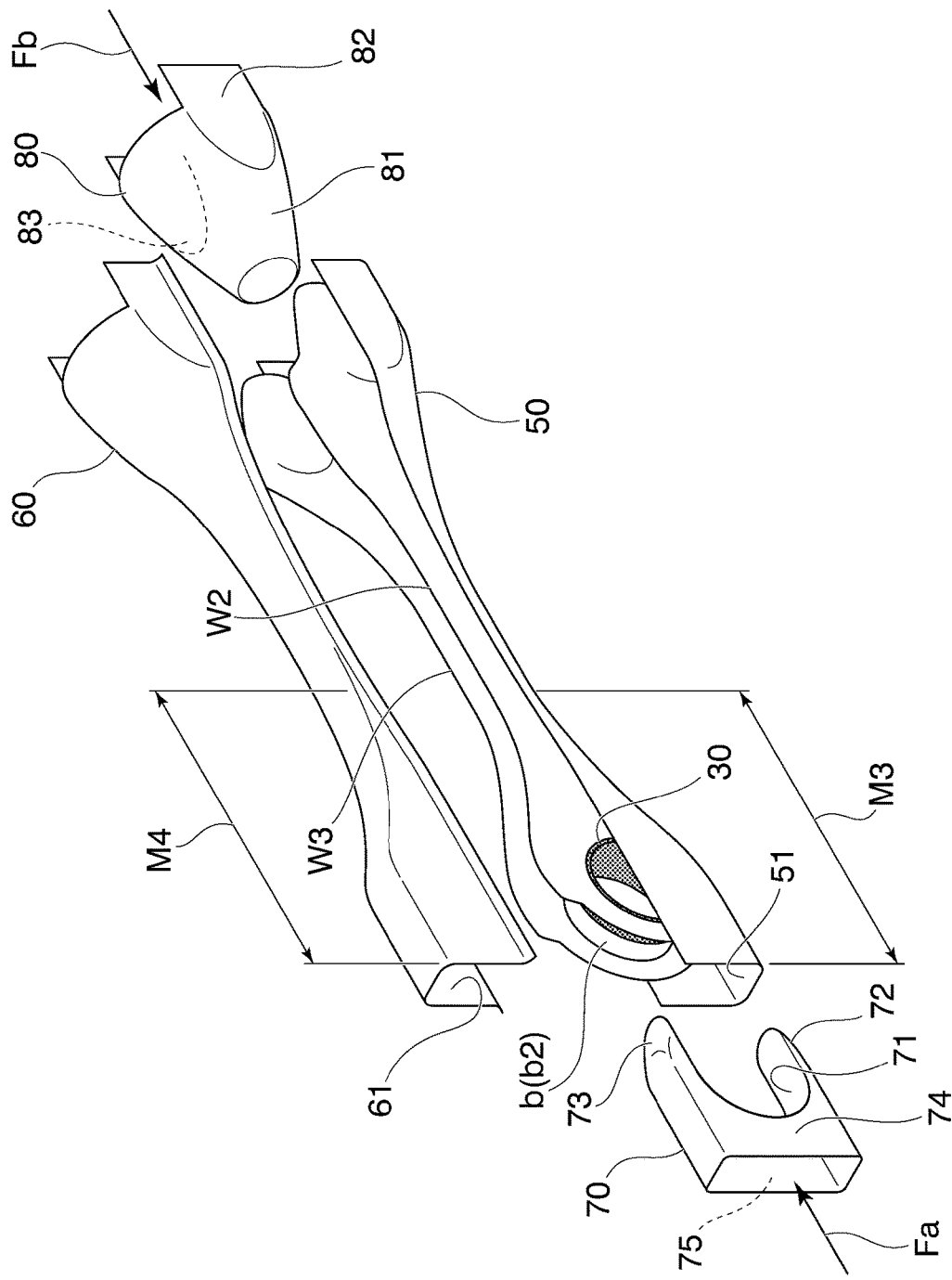
FIG. 6 is a perspective view showing a die used in an O-bending process shown in FIG. 2(g) in the manufacturing device for a link part used in the manufacturing method for the link part.

As shown in FIGS. 2(g) and 6, the O-bending machine includes a lower die 50 configured to receive the intermediate part W after the axial bending, an upper die 60 that forms a closed cross-section space together with the lower die 50 and accommodates the intermediate part W in the closed cross-section space, a die drive mechanism (not shown in the drawings) that brings the upper die 60 closer to and further away from the lower die 50, a first core 70 inserted and removed with respect to one end side in the intermediate part W, a second core 80 inserted and removed with respect to the other end side in the intermediate part W, and a core drive mechanism (third drive mechanism, not shown in the drawings) that brings the first core 70 and the second core 80 closer to and further away from the intermediate part W.

The lower die 50 has a recessed groove 51 that is long in one direction. The recessed groove 51 opens upward and has a concave surface shape that aligns with an outer shape of a bottom portion of the intermediate part W after the axial bending. That is, the recessed groove 51 has a concave surface shape that aligns with the outer shape of the bottom portion of the link part L. The recessed groove 51 has a smallest groove width and a smallest groove depth at a center position in the longitudinal direction. The groove width of the recessed groove 51 gradually increases and the groove depth thereof also gradually increases from the center position in the longitudinal direction toward both end positions. The groove width and the groove depth of the recessed groove 51 are substantially constant in the longitudinal direction at both end positions thereof.

The upper die 60 has a recessed groove 61 that is long in one direction. The recessed groove 61 opens downward and applies bending processing by coming into contact with the upper end edge of the first side wall W2 and the upper end edge of the second side wall W3 of the intermediate part W after the axial bending. The recessed groove 61 has a concave surface shape that aligns with an outer shape of an upper portion of the link part L. The recessed groove 61 has a smallest groove width and a smallest groove height at a center position in the longitudinal direction. The groove width of the recessed groove 61 gradually increases and the groove height thereof also gradually increases from the center position in the longitudinal direction toward both end positions. The groove width and the groove depth of the recessed groove 61 are substantially constant in the longitudinal direction at both end positions thereof.

The die drive mechanism brings the upper die 60 closer to and further away from the lower die 50 fixed at its regular position from above. When the upper die 60 is caused to align with the lower die 50, the recessed groove 51 and the recessed groove 61 align with each other and a closed cross-section space is formed therein.

As shown in FIG. 6, the first core 70 has a concave curved surface 71 that aligns with the outer circumferential surface a2 of the burring vertical wall a and the outer circumferential surface b2 of the burring vertical wall b, a lower surface 72 that aligns with an inner bottom surface of the intermediate part W on one end side in the longitudinal direction, and an upper surface 73 that aligns with an inner upper surface of the one end portion LA of the link part L. Further, the first core 70 has a first side surface 74 that matches the first side wall W2 of the intermediate part W, and a second side surface 75 that matches the second side wall W3. Then, the first core 70 is driven in an arrow Fa direction by the core drive mechanism to be inserted between the first side wall W2 and the second side wall W3 and between both the outer circumferential surfaces of the burring vertical walls a and b and the inner surface of the connecting wall W1.

As shown in FIG. 6, the second core 80 has an outer circumferential surface 81 having a truncated cone shape and a pair of side surfaces 82 and 83 continuous with the outer circumferential surface 81 and parallel to each other.

The outer circumferential surface 81 aligns with an inner circumferential surface of the other end portion LB of the link part L. The side surfaces 82 and 83 also align with the inner circumferential surface of the other end portion LB of the link part L. Then, the second core 80 is driven in an arrow Fb direction by the core drive mechanism to be inserted between the first side wall W2 and the second side wall W3.

According to the O-bending machine having the above-described configuration, first, the intermediate part W is accommodated in the recessed groove 51 of the lower die 50. Thereafter, the first core 70 and the second core 80 are inserted between the first side wall W2 and the second side wall W3 by the core drive mechanism. Thereafter, the upper die 60 is lowered toward the lower die 50 by the die drive mechanism so that the recessed groove 61 presses the upper end edges of the first side wall W2 and the second side wall W3 while abutting on them. As a result, the O-bending processing is performed so that the upper end edges of the first side wall W2 and the second side wall W3 are brought close to each other. Then, when the upper end edges align with each other, a closed cross-sectional shape is formed in the intermediate part W.

Next, a manufacturing method for a link part using the manufacturing device for the link part having the above-described configuration will be described below.

The manufacturing method for a link part includes a die-cutting process (material preparation process), a burring process, a U-bending process, a reinforcing process, an axial bending process, an O-bending process, a through hole forming process, and a metal core extracting process.

In the die-cutting process, a prepared flat plate is fixed on the recessed groove of the die-cutting machine. Then, the die and the punch are brought close to each other by the punch drive mechanism of the die-cutting machine, and thereby the protruding part of the punch punches the flat plate to form the flat plate material P. Further, cutting may also be performed by a laser cutting machine or the like instead of the die-cutting by a combination of the punch and the die.

In the burring process, the flat plate material P obtained by the die-cutting processing or the like is fixed on the die of the burring machine. Then, when the punch is made to pass through the first pilot hole and the second pilot hole by the punch drive mechanism of the burring machine, the burring holes a1 and b1 are formed in the first pilot hole and the second pilot hole. The flat plate material P obtained in this way is shown in FIG. 2(a).

In the U-bending process, as shown in FIG. 2(b), the flat plate material P after the burring process is placed on the die 10, and the flat plate material P is pressurized by the punch 20 by the punch drive mechanism of the U-bending machine to be pushed into the recessed groove 11. As a result, the portion P2 and the portion P3 are bent to face each other with the portion P1 of the flat plate material P as a boundary. The intermediate part W obtained by taking it out from the recessed groove 11 is shown in FIG. 2(c). Not by such a U-bending process, the intermediate part W whose cross-sectional shape is substantially a U-shape as shown in FIG. 2(c) obtained by a known method such as subjecting the flat plate material P to bending by 90° at two portions may also be used.

In the reinforcing process, the intermediate part W obtained in the U-bending process is fixed to the first holding mechanism of the metal core inserting and removing machine. Next, a driving force applied from the drive mechanism moves the holding mechanism to insert the metal core 30 into the burring holes a1 and b1 of the intermediate part W coaxially. The intermediate part W after the metal core 30 is inserted is shown in FIG. 2(d).

Further, as a form of inserting the metal core 30 into the buffing holes a1 and b1, there are "insertion" and "press-fitting." The "insertion" in the present embodiment refers to a method of inserting the metal core 30 in which inner shapes or inner diameters of the burring holes a1 and b1 are not made equal to or larger than the original dimensions by inserting the metal core 30. On the other hand, the "press-fitting" in the present embodiment refers to a method of inserting the metal core 30 in which inner shapes or inner diameters of the burring holes a1 and b1 are made larger than the original dimensions by inserting the metal core 30. Here, insertion or press-fitting is determined by setting a magnitude relation of the outer shape or the outer diameter of the metal core 30 with respect to the inner shapes or the inner diameters of the burring holes a1 and b1.

When the metal core 30 is press-fitted in the reinforcing process, a tensile force along inner circumferential surfaces of the buffing holes a1 and b1 is applied to the burring holes a1 and b1.

The outer diameter of the metal core (or a perimeter of an outer surface of the metal core) may be made substantially the same as the inner diameter of the buffing hole (or a perimeter of an inner surface of the burring hole). For example, a diameter ratio (outer diameter of metal core/inner diameter of burring hole) or a perimeter ratio (perimeter of outer surface of metal core/perimeter of inner surface of burring hole) may be in a range of 1.000±0.005, 1.000±0.003, or 1.000±0.001. However, the outer diameter of the metal core (or the perimeter of the outer surface of the metal core) is preferably slightly larger than the inner diameter of the buffing hole (or the perimeter of the inner surface of the buffing hole). For example, the diameter ratio (outer diameter of metal core/inner diameter of burring hole) or the perimeter ratio (perimeter of outer surface of metal core/perimeter of inner surface of burring hole) may be made larger than 1.000 or may be made 1.001 or more. In this case, tensile stress is generated on the inner surface of the burring hole by a difference between the outer diameter of the metal core and the inner diameter of the burring hole. This is because, since the burring holes a1 and b1 are reinforced from the inside by the tensile stress, deformation of the buffing holes a1 and b1 is effectively curbed. Since the burring holes a1 and b1 are circular, the tensile stress serves as a hoop force applied to the burring holes a1 and b1. A lower limit of the diameter ratio or the perimeter ratio may also be set to 1.002, 1.003, or 1.005. As long as the metal core can be inserted into the burring hole, there is no need to define an upper limit of the diameter ratio or the perimeter ratio, but it may be set to 1.050, 1.040, or 1.030. Also, if necessary, a cross section of the metal core may have a tapered shape so that the metal core can be easily inserted into the burring holes a1 and b1. In this case, the above-described diameter ratio or perimeter ratio is set to a value calculated from a maximum diameter of the metal core.

Further, as the metal core 30, the outer circumferential surface need only be in close contact with the inner circumferential surfaces of the burring holes a1 and b1 without gaps, and the metal core 30 may be simply inserted instead of being press-fitted.

In the axial bending process, the intermediate part W obtained in the reinforcing process is disposed in the recessed groove 11 of the die 10 that is open as shown in FIG. 2(e). Then, the punch 40 is pushed downward by the punch drive mechanism of the axial bending machine, and the intermediate part W is axially bent in the recessed groove 11. That is, the bottom portion of the intermediate part W before the axial bending has a linear shape in a side view, but the intermediate part W is axially bent so that the bottom portion has a concave shape in the side view. During the axial bending, since inner circumferential surfaces of the burring holes a1 and b1 of the intermediate part W are always supported by the metal core 30, processing accuracy thereof is maintained without being damaged.

An upper shape and a lower shape of the intermediate part W after the axial bending process are substantially symmetrical, but since the upper end edge of the first side wall W2 and the upper end edge of the second side wall W3 has not been aligned, the closed cross-sectional shape has not yet been formed at this time point.

In the O-bending process, the intermediate part W obtained in the axial bending process is accommodated in the recessed groove 51 of the lower die 50 as shown in FIG. 2(g). Then, the first core 70 and the second core 80 are inserted between the first side wall W2 and the second side wall W3 by the core drive mechanism.

Next, the upper die 60 is lowered toward the lower die 50 by the die drive mechanism to perform the O-bending processing so that the upper end edges of the first side wall W2 and the second side wall W3 are brought close to each other by the recessed groove 61. When the upper end edges align with each other, a cross section perpendicular to the longitudinal direction becomes a closed cross-sectional shape at any position of the intermediate part W in the longitudinal direction, and the O-bending process is completed. Further, the upper end edges may be joined to each other by welding or the like.

During the O-bending process, since the inner circumferential surfaces of the burring holes a1 and b1 of the intermediate part W are always supported by the metal core 30, processing accuracy thereof is maintained without being damaged.

Further, when the mating portions between the upper end edge of the first side wall W2 and the upper end edge of the second side wall W3 at one end portion and the other end portion of the intermediate part W are circular or elliptical when viewed in a cross section perpendicular to the longitudinal direction, the process of inserting the first core 70 and the second core 80 may be omitted.

In the through hole forming process, the through holes c1 and d1 are coaxially formed in the intermediate part W (FIG. 2(h)) obtained in the O-bending process. Since the through holes c1 and d1 have a smaller diameter than the burring holes a1 and b1, they can be formed after the O-bending process, but the through holes c1 and d1 may also be formed in advance at the time of the die-cutting process. Further, the through holes c1 and d1 may also be made as burring holes. In that case, buffing by the same method as the burring holes a1 and b1 is preferably performed at the stage of obtaining the flat plate material P shown in FIG. 2(a). In addition, it is more preferable to insert another metal core into the burring holes at the stage of the intermediate part W shown in FIG. 2(d).

In the metal core extracting process, the metal core 30 is extracted from the burring holes a1 and b1. As a result, the link part L shown in FIG. 1 is completed. Further, when the metal core 30 is used as it is as a part of the link part L, the metal core extracting process is omitted.

According to the manufacturing device and the manufacturing method for a link part described above, even when an external force for performing the axial bending shown in FIGS. 2(e) and 2(f) and the O-bending shown in FIGS. 2(g) and 2(h) is applied to the intermediate part W, roundness and axial core accuracy (coaxiality) of the burring holes a1 and b1 are always maintained by the metal core 30. Therefore, the link part L having the burring holes a1 and b1 (connecting holes) with high dimensional accuracy can be obtained.

Further, in the manufacturing processes shown in FIG. 2, a case in which the burring holes a1 and b1 are formed as connecting holes has been exemplified. However, the present invention is not limited only to this embodiment, and the burring process may be omitted. In this case, after the flat plate material P is obtained in the die-cutting process, the U-bending process is performed without performing the burring process. Then, the first pilot hole and the second pilot hole obtained in the die-cutting process serve as the above-described connecting holes.

The embodiment described above is an example of the present invention and can be appropriately modified as needed.

For example, the longitudinal sectional shape of the link part L from one end portion LA to the central portion LC is not limited only to the shape shown in FIG. 1. That is, in the above-described embodiment, the longitudinal sectional shape is such that the bottom wall part g bulges downward at a position of one end portion LA and is recessed upward at a connecting position between the one end portion LA and the central portion LC. On the other hand, for example, as shown in FIG. 7, a link part L1 in which upper and lower surfaces of the burring holes a1 and b1 are flat (linear) in a side view may also be employed.

In manufacturing the link part L1, it can be manufactured by changing a shape of each die used for the axial bending shown in FIGS. 2(e) and 2(f) and the O-bending shown in FIGS. 2(g) and 2(h). More specifically, in the axial bending, a longitudinal sectional shape of the bottom surface 11d of the die 10 and a longitudinal sectional shape of the pressurizing surface 41 of the punch 40 shown in FIG. 5 are changed. That is, a range of reference symbol M1, shown in FIG. 5, of the bottom surface 11d of the die 10 is formed as a linear inclined surface that is lowered from a center position in the longitudinal direction toward an end edge position. Also, a range of reference symbol M2, shown in FIG. 5, of the pressurizing surface 41 of the punch 40 is also formed as a linear inclined surface that is lowered from the center position in the longitudinal direction toward the end edge position. The connecting wall W1 of the intermediate part W is sandwiched between the pressurizing surface 41 and the bottom surface 11d to be aligned with such a linear shape and is formed into a linear shape.

Also, in the O-bending, a longitudinal sectional shape of the recessed groove 51 of the lower die 50, a longitudinal sectional shape of the recessed groove 61 of the upper die 60, and longitudinal sectional shapes of the lower surface 72 and the upper surface 73 of the first core 70 shown in FIG. 6 are changed. That is, a range of reference symbol M3 of the recessed groove 51 in FIG. 6 is formed as a linear inclined surface that rises from the center position in the longitudinal direction toward the end edge position. Also, a range of reference symbol M4 of the recessed groove 61 in FIG. 6 also is formed as a linear inclined surface that rises from the center position in the longitudinal direction toward the end edge position. Further, a longitudinal sectional shape of the lower surface 72 is formed as a linear inclined surface corresponding to the inclined surface of the recessed groove 51. Similarly, a longitudinal sectional shape of the upper surface 73 is formed as a linear inclined surface corresponding to the inclined surface of the recessed groove 61.

Figure 7:
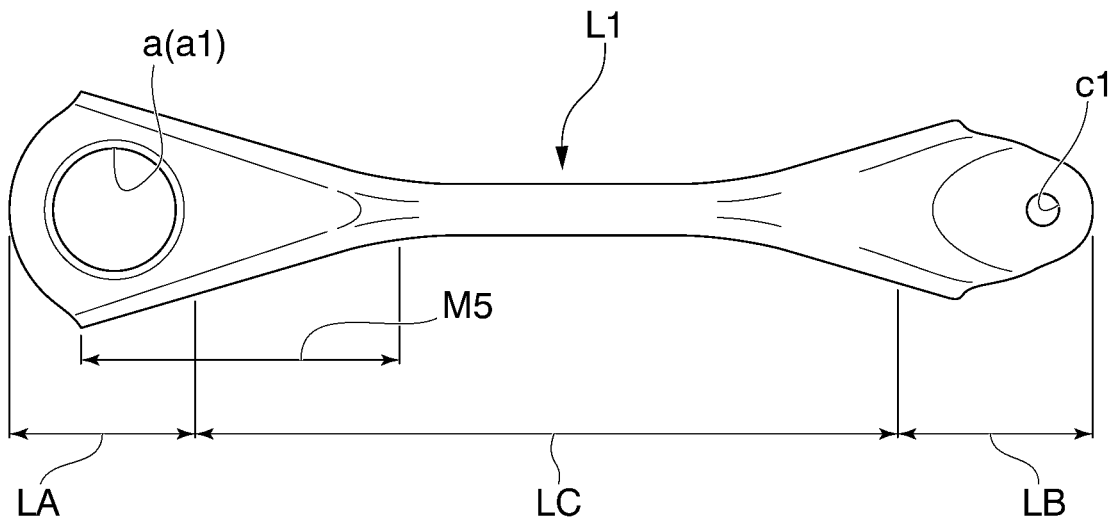
FIG. 7 is a side view showing a modified example of the link part.

Then, O-bending is performed by sandwiching the connecting wall W1 between the recessed groove 51 and the lower surface 72 and further sandwiching the upper end edge of the first side wall W2 and the upper end edge of the second side wall W3 between the recessed groove 61 and the upper surface 73, and thereby the link part L1 shown in FIG. 7 can be obtained. When the link part L1 is viewed in the longitudinal direction, an upper portion and a lower portion of a range MS from one end portion LA to a connecting portion between the one end portion LA and the central portion LC form a linear shape in a side view. When the upper portion and the lower portion of the burring holes a1 and b1 are made to have a flat shape in this way in a side view, processing accuracy of the buffing holes a1 and b1 can be further enhanced in addition to the effect due to use of the metal core 30.

When this point is described by taking a case in which the metal core 30 is press-fitted as an example, first, at the start of the axial bending process, a point Pr1 at the farthest end of the pressurizing surface 41 of the punch 40 is first abuts against the inner surface of the connecting wall W1 and pressurizes in an arrow F1 direction as shown in FIG. 5. A pressing force due to such a point contact generates a force of pulling a portion closest to the point Pr1 in peripheral portions of the burring holes a1 and b1 as shown by an arrow F2. Even when such a force is generated, the burring holes a1 and b1 can be supported by a hoop stress generated on the inner circumferential surface due to the metal core 30 press-fitted in advance into the burring holes a1 and b1.

On the other hand, in the modified example shown in FIG. 7, when the inner surface of the connecting wall W1 is pressed by the punch 40 for the axial bending, since the axial bending is performed while a straight state of the inner surface of the connecting wall W1 is maintained without being partially bulged, the force shown in the arrow F2 is not generated. Therefore, higher processing accuracy can be obtained in addition to the reinforcing effect due to the metal core 30.

Also, in the process of O-bending processing, since the upper surface 73 of the first core 70 shown in FIG. 6 presses the upper end edge of the first side wall W2 and the upper end edge of the second side wall W3 from the inside thereof to deform the outer shape into a convex shape, some partial tension is applied to the peripheral portions of the burring holes a1 and b1 for the same reason as in the case of the axial bending. On the other hand, in the modified example shown in FIG. 7, since the longitudinal sectional shape of the upper surface 73 is formed as a linear inclined surface corresponding to the inclined surface of the recessed groove 61, partial tension is not applied to the peripheral portions of the burring holes a1 and b1. Therefore, higher processing accuracy can be obtained in addition to the reinforcing effect due to the metal core 30.

Also, as described above, the burring holes a1 and b1 are formed in the present embodiment, but the present invention is not limited only to the embodiment. The burring holes a1 and b1 may not be formed by omitting the burring process. In this case, the first pilot hole and the second pilot hole, which are through holes formed in the die-cutting process, may be used as the connecting holes of the link part L. More specific description will be made in a third embodiment to be described later. Also, the connecting hole is not limited to a circular shape and, for example, may be a semicircular hole or may have other hole shapes such as an ellipse or a quadrangle.

Figure 8:
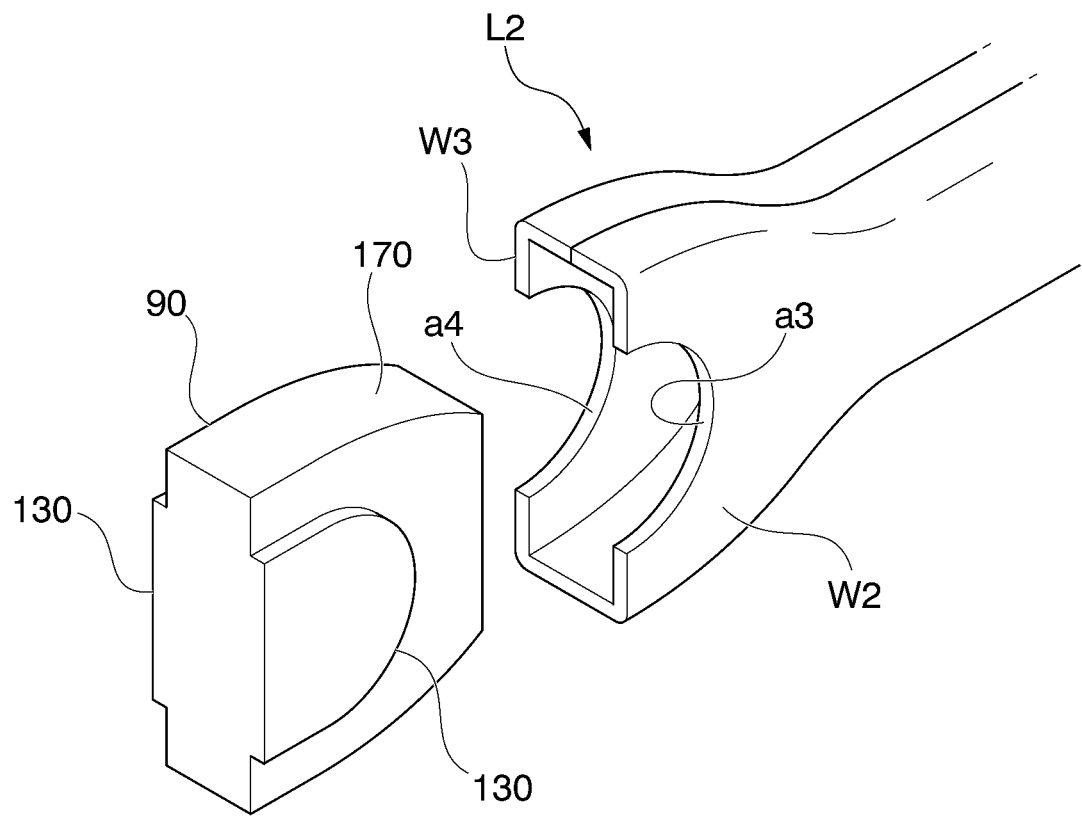
FIG. 8 is a partially enlarged perspective view showing another modified example of the link part.

For example, in a case of a link part L2 in which connecting holes are formed as open semicircular pilot holes a3 and a4 shown in FIG. 8, a jig 90 serving as both the metal core 30 and the first core 70 can be used. In the jig 90, a jig main body 170 is a portion corresponding to the first core 70, and a pair of convex parts 130 are portions corresponding to the metal core 30. External dimensions of the pair of convex parts 130 are formed to be slightly larger than those of the semicircular pilot holes a3 and a4.

In this case, even when an external force is applied to the first side wall W2 and the second side wall W3 in the O-bending process, when the pair of convex parts 130 are press-fitted beforehand, a tensile force along edge portions of the semicircular pilot holes a3 and a4 is applied to the pilot holes a3 and a4. Since the pilot holes a3 and a4 are reinforced from the inside in advance by the tensile force, deformation and axial deviation of the pilot holes a3 and a4 due to post-processing can be effectively curbed.

Second Embodiment

Figure 9:
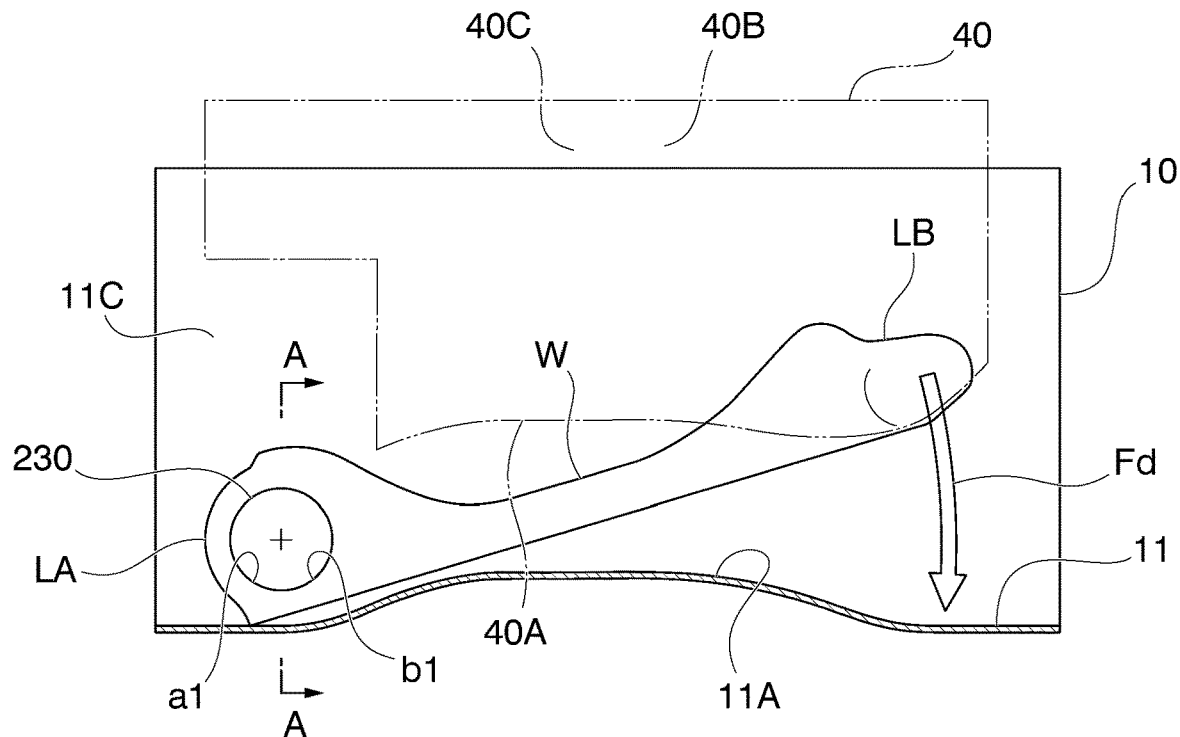
FIG. 9 is a view showing a manufacturing method and a manufacturing device for a link part according to a second embodiment of the present invention, and is a longitudinal sectional view showing a process alternative to the axial bending process shown in FIG. 2(f).
Figure 10:
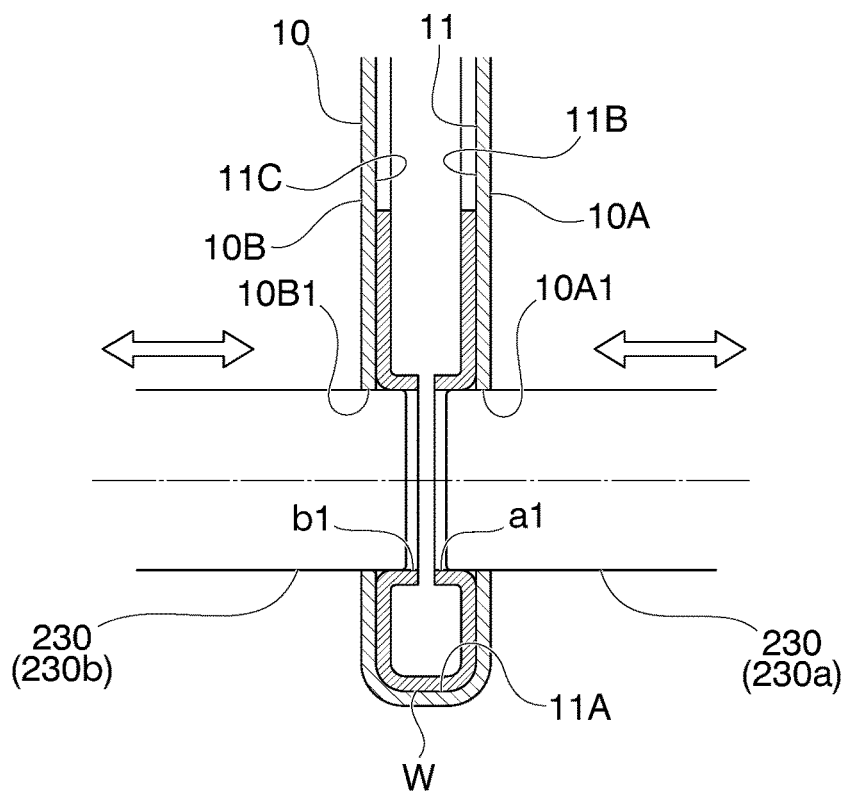
FIG. 10 is a view showing the manufacturing device for the link part and is a cross-sectional view along line A-A of FIG. 9.

Next, a second embodiment of the present invention will be described below with reference to FIGS. 9 and 10. In the present embodiment, instead of the metal core 30 used in the first embodiment, as shown in FIGS. 9 and 10, it is different from the first embodiment in that a pair of metal cores 230 are coaxially disposed in a die 10 and inserted into and removed from a recessed groove 11. That is, the pair of metal cores 230 are a part of the die 10 and are extracted after a link part L is manufactured. Hereinafter, differences from the above-described first embodiment will be mainly described, other matters will be the same as those of the first embodiment, and duplicate description thereof will be omitted.

A manufacturing device for a link part of the present embodiment includes the die (fifth die) 10, a punch (sixth die) 40, a fourth drive mechanism (not shown in the drawings) that brings relative positions between the die 10 and the punch 40 closer to and further away from each other, and a fifth drive mechanism (not shown in the drawings) for inserting and removing the pair of metal cores 230 with respect to a pair of through holes 10A1 and 10B1 provided in the die 10.

As shown in FIGS. 9 and 10, the die 10 includes an arcuate surface (third arcuate surface) 11A that is in contact with an outer surface of a connecting wall W1 and has a convex shape in a longitudinal sectional view, an inner side surface 11B (fifth side surface) that is in contact with an outer surface of a first side wall W2, an inner side surface (sixth side surface) 11C that is in contact with an outer surface of a second side wall W3, and the pair of through holes 10A 1 and 10B1 coaxially penetrating the inner side surfaces 11B and 11C. The through holes 10A1 and 10B1 are not limited only to a circular shape and, for example, may be a semicircular hole or may have other hole shapes such as an ellipse or a quadrangle.

Also, as shown in FIG. 9, the punch 40 includes an arcuate surface (fourth arcuate surface) 40A that is in contact with an inner surface of the connecting wall W1 and has a concave shape in a longitudinal sectional view, an outer side surface (seventh side surface) 40B that is in contact with an inner surface of the first side wall W2, and an outer side surface (eighth side surface) 40C that is in contact with an inner surface of the second side wall W3.

The pair of metal cores 230 includes a metal core (first part metal core) 230a inserted into and removed from the through hole 10A1 of the inner side surface (the fifth side surface) 11B, and a metal core (second part metal core) 230b inserted into and removed from the through hole 10B1 of the inner side surface (the sixth side surface) 11C and coaxial with the metal core 230a.

The fifth drive mechanism includes a first drive unit (not shown in the drawings) for inserting and removing the metal core 230a into and from the through hole 10A1, and a second drive unit (not shown in the drawings) for inserting and removing the metal core 230b into and from the through hole 10B1.

When an axial bending process is performed with the above-described device configuration, an intermediate part W is first disposed in the recessed groove 11, and then the metal cores 230 are made to pass through buffing holes a1 and b1. FIG. 9 shows a state in which one end side of the intermediate part W is fixed in the die 10 in this way. As shown in FIG. 9, a shape of a bottom surface of the recessed groove 11 has a convex cross-sectional shape in which a central portion in a longitudinal direction is raised when viewed in a longitudinal section in the longitudinal direction. Therefore, when one end side of the intermediate part W is fixed in the vicinity of the bottom surface of the recessed groove 11 by the metal core 230, the other end side of the intermediate part W is separated from the bottom surface of the recessed groove 11. As a result, the intermediate part W is obliquely disposed so that one end side thereof is relatively low and the other end side is relatively high.

The punch 40 is lowered from above with respect to the intermediate part W which is obliquely disposed as described above. Then, the punch 40 first abuts against the other end side of the intermediate part W and pushes it vertically downward. As a result, the other end side of the intermediate part W is pushed downward by the punch 40 as shown by an arrow Fd. At this time, the bottom surface of the central portion of the intermediate part W in the longitudinal direction is bent to align with the convex cross-sectional shape of the bottom surface of the recessed groove 11. Then, a bottom wall of the intermediate part W is completely sandwiched between the bottom surface of the recessed groove 11 and a lower surface of the punch 40, and thereby the axial bending is completed.

After the axial bending process is completed, first, an extraction process for extracting the metal cores 230a and 230b from the intermediate part W is performed, and then the punch 40 is raised to be taken out from the inside of the die 10. Thereafter, the link part L is obtained by performing an O-bending process or the like as in the first embodiment.

Third Embodiment

Next, a third embodiment of the present invention will be described below with reference to FIG. 11. The present embodiment is different from the first embodiment in that a link part having a pilot hole instead of the burring holes a1 and b1 is manufactured. Therefore, differences from the above-described first embodiment will be mainly described, other matters will be the same as those of the first embodiment, and duplicate description thereof will be omitted.

In a manufacturing method for a link part of the present embodiment, the burring process of the above-described first embodiment will be omitted. Therefore, the manufacturing method for a link part of the present embodiment includes a die-cutting process (material preparation process), a U-bending process, a reinforcing process, an axial bending process, an O-bending process, a through hole forming process, and a metal core extracting process.

In the die-cutting process, a prepared flat plate is fixed on a recessed groove of a die-cutting machine. Then, a die and a punch are brought close to each other by a punch drive mechanism of the die-cutting machine, and thereby a protruding part of the punch punches the flat plate to form a flat plate material Pa shown in FIG. 11(a). A first pilot hole a1a and a second pilot hole b1a are formed in the flat plate material Pa.

Further, instead of the die cutting by a combination of the punch and the die, die cutting by laser processing may also be performed.

In the U-bending process, as shown in FIG. 11(b), the flat plate material Pa after the die-cutting process is placed on a die 10, and the flat plate material Pa is pressed by a punch 20 by a punch drive mechanism of a U-bending machine and is pushed into a recessed groove 11. As a result, a portion P2a and a portion P3a are bent to face each other with a portion P1a of the flat plate material Pa shown in FIG. 11(a) as a boundary. An intermediate part Wa taken out from the recessed groove 11 is shown in FIG. 11(c).

The intermediate part Wa includes a first side wall W2a having a first pilot hole a1a, a second side wall W3a having a second pilot hole b1a and disposed to face the first side wall W2a, and a connecting wall W1a connecting a lower edge (one side edge) of the first side wall W2a and a lower edge (one side edge) of the second side wall W3a. The intermediate part Wa is long in one direction. The connecting wall W1a has a linear shape in a side view. A distance between the first side wall W2a and the second side wall W3a is the smallest at a center position and gradually increases from the center position toward both end positions when viewed in a longitudinal direction of the intermediate part Wa. The first pilot hole a1a and the second pilot hole b1a are disposed to face each other to be coaxial with each other.

In the reinforcing process following the U-bending process, the intermediate part Wa is fixed to a first holding mechanism of a metal core inserting and removing machine. Next, a driving force applied from the drive mechanism moves the first holding mechanism to insert a metal core 30 into the first pilot hole a1a and the second pilot hole b1a of the intermediate part Wa coaxially. The metal core 30 includes an outer circumferential surface having an outer diameter dimension slightly larger than those of the first pilot hole a1a and the second pilot hole b1a of the intermediate part Wa, and an inner circumferential surface held by the first holding mechanism. In this case, a method of inserting the metal core 30 is "press fitting." The intermediate part Wa after the press fitting is shown in FIG. 11(d).

As in the first embodiment, an outer diameter of the metal core (or a perimeter of an outer surface of the metal core) may be substantially the same as an inner diameter of the pilot hole (or a perimeter of an inner surface of the pilot hole). For example, a diameter ratio (outer diameter of metal core/inner diameter of pilot hole) or a perimeter ratio (perimeter of outer surface of metal core/perimeter of inner surface of pilot hole) may be in a range of 1.000±0.005, 1.000±0.003, or 1.000±0.001. However, the outer diameter of the metal core (or perimeter of the outer surface of the metal core) is preferably slightly larger than the inner diameter of the pilot hole (or perimeter of the inner surface of the pilot hole). For example, the diameter ratio (outer diameter of metal core/inner diameter of pilot hole) or the perimeter ratio (perimeter of outer surface of metal core/perimeter of inner surface of pilot hole) may be made larger than 1.000 or may be 1.001 or more. In this case, tensile stress is generated on the inner surface of the pilot hole by a difference between the outer diameter of the metal core and the inner diameter of the pilot hole. Due to the metal core 30 inserted in the reinforcing process, the tensile stress along edge portions of the first pilot hole a1a and the second pilot hole b1a is applied to the first pilot hole a1a and the second pilot hole b1a. Since the first pilot hole a1a and the second pilot hole b1a are reinforced from the inside by the tensile stress, deformation and axial deviation of the first pilot hole a1a and the second pilot hole b1a can be effectively curbed. Since the first pilot hole a1a and the second pilot hole b1a are circular, the tensile stress serves as a hoop force applied to the first pilot hole a1a and the second pilot hole b1a. Further, a lower limit of the above-described diameter ratio or perimeter ratio may be set to 1.002, 1.003, or 1.005. As long as the metal core can be inserted into the pilot hole, there is no need to define an upper limit of the diameter ratio or the perimeter ratio, but it may be set to 1.050, 1.040, or 1.030. Also, if necessary, a cross section of the metal core may have a tapered shape so that the metal core can be easily inserted into the pilot hole. In this case, the above-described diameter ratio or perimeter ratio is set to a value calculated from a maximum diameter of the metal core.

The metal core may be a ring-shaped jig or may be a solid columnar jig. A metal core for each of two separated burring holes may be used, but in order to improve coaxiality of the burring holes, a metal core in which two metal cores are integrated (one metal core as a result of the integration) is preferably used.

Figure 11:
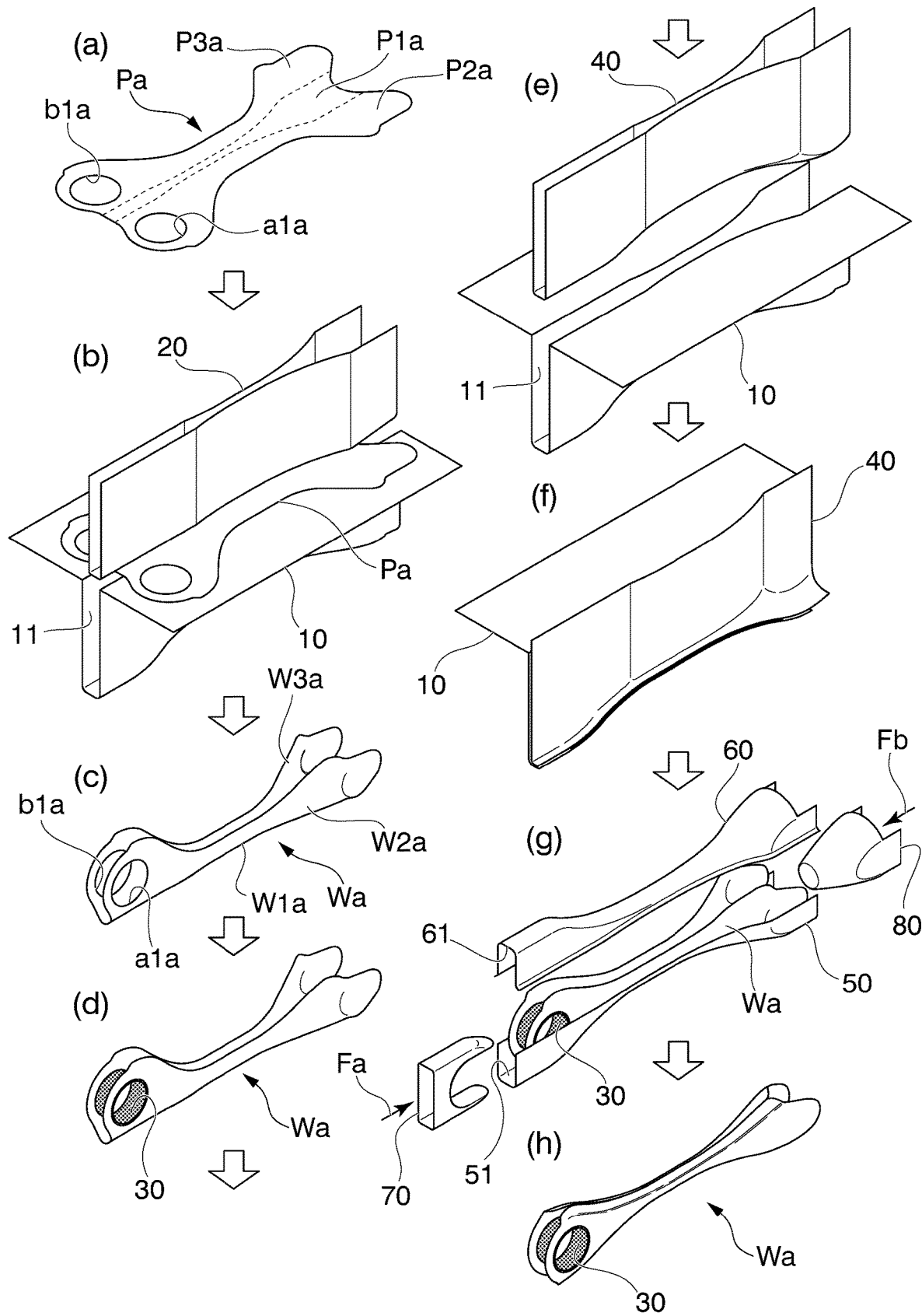
FIG. 11 is a view showing a manufacturing method and a manufacturing device for a link part according to a third embodiment of the present invention, in which each process proceeds in order of (a) to (h).

In the axial bending process, the intermediate part Wa obtained in the reinforcing process is disposed in the recessed groove 11 of the die 10 that is open as shown in FIG. 11(*e*). Then, a punch 40 is pushed downward by the punch drive mechanism of an axial bending machine, and the intermediate part Wa is axially bent in the recessed groove 11. Further, the punch 40 of the present embodiment does not have a level difference unlike the punch 40 described in the first embodiment.

A bottom portion of the intermediate part Wa before the axial bending has a linear shape in a side view, but in the present axial bending process, the intermediate part Wa is axially bent so that the bottom portion has a concave shape in the side view. During the axial bending, since the first pilot hole a1a and the second pilot hole b1a of the intermediate part Wa are always supported by the metal core 30, processing accuracy (roundness accuracy and coaxial accuracy) thereof is maintained without being damaged.

An upper shape and a lower shape of the intermediate part Wa after the axial bending process are substantially symmetrical, but since the upper end edge of the first side wall W2a and the upper end edge of the second side wall W3a has not been aligned, a closed cross-sectional shape has not yet been formed at this time point.

In the O-bending process, the intermediate part Wa obtained in the axial bending process is accommodated in a recessed groove 51 of a lower die 50 as shown in FIG. 11(*g*). Then, a first core 70 and a second core 80 are inserted between the first side wall W2a and the second side wall W3a by a core drive mechanism.

Next, an upper die 60 is lowered toward the lower die 50 by a die drive mechanism to perform the O-bending processing so that the upper end edges of the first side wall W2a and the second side wall W3a are brought close to each other by a recessed groove 61 thereof. When the upper end edges align with each other, a cross section perpendicular to the longitudinal direction becomes a closed cross-sectional shape at any position of the intermediate part Wa in the longitudinal direction, and the O-bending process is completed. Further, the upper end edges may be joined to each other by welding or the like.

During the O-bending, since the first pilot hole a1a and the second pilot hole b1a of the intermediate part Wa are always supported by the metal core 30, processing accuracy (roundness accuracy and coaxial accuracy) thereof is maintained without being damaged.

Further, when the mating portions between the upper end edge of the first side wall W2a and the upper end edge of the second side wall W3a at one end portion and the other end portion of the intermediate part Wa are circular or elliptical when viewed in a cross section perpendicular to the longitudinal direction, the process of inserting the first core 70 and the second core 80 may be omitted.

In the through hole forming process, through holes c1 and d1 are coaxially formed in the intermediate part Wa (FIG. 11(*h*)) obtained in the O-bending process. Since the through holes c1 and d1 have a smaller diameter than the first pilot hole a1a and the second pilot hole b1a, they can be formed after the O-bending process, but the through holes c1 and d1 may also be formed in advance at the time of the die-cutting process.

In the metal core extracting process, the metal core 30 is extracted from the first pilot hole a1a and the second pilot hole b1a. As a result, the link part is completed. Further, when the metal core 30 is used as it is as a part of the link part, the metal core extracting process is omitted.

According to the manufacturing device and the manufacturing method for a link part described above, even when an external force for performing the axial bending shown in FIGS. 11(*e*) and 11(*f*) and the O-bending shown in FIGS. 11(*g*) and 11(*h*) is applied to the intermediate part Wa, shapes and dimensions of the first pilot hole a1a and the second pilot hole b1a are always maintained by the metal core 30. Therefore, the link part having the first pilot hole a1a and the second pilot hole b1a (connecting holes) with high dimensional accuracy (roundness accuracy and coaxial accuracy) can be obtained.

Further, the second embodiment described above is an example of the present invention and can be appropriately modified as needed. For example, as shown in FIG. 7, a link part whose upper and lower surfaces are flat (linear) in a side view may also be employed. In this case, when the inner surface of the connecting wall W1a is pressed by the punch 40 for the axial bending, since the axial bending is performed while a straight state of the inner surface of the connecting wall W1a is maintained without being partially bulged, a force that partially pulls the first pilot hole a1a and the second pilot hole b1a outward in a radial direction is not generated. Therefore, higher processing accuracy can be obtained in addition to the reinforcing effect due to the metal core 30.

Fourth Embodiment

Figure 12:
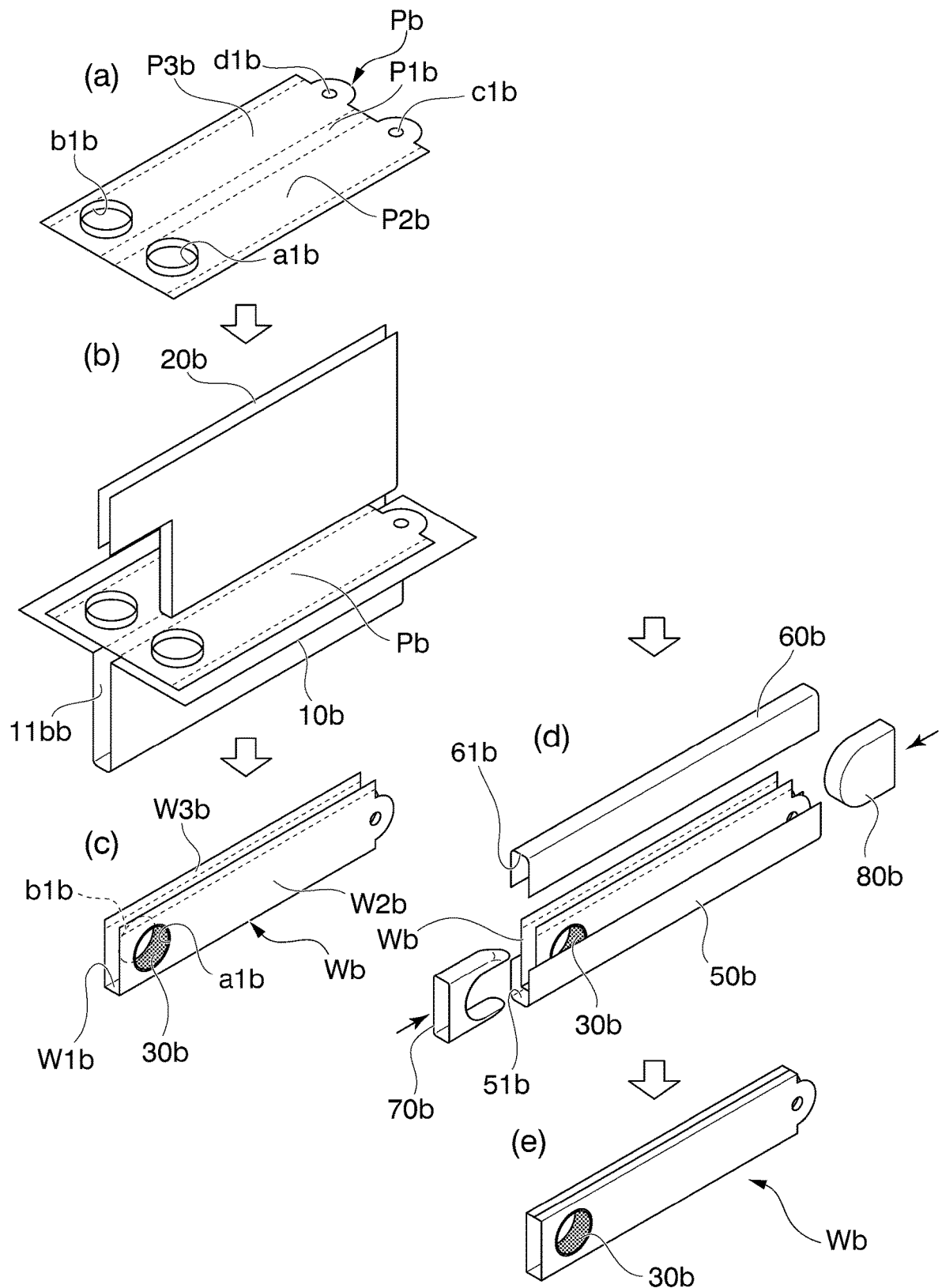
FIG. 12 is a view showing a manufacturing method and a manufacturing device for a link part according to a fourth embodiment of the present invention, in which each process proceeds in order of (a) to (e).

Next, a fourth embodiment of the present invention will be described below with reference to FIG. 12. The present embodiment is different from the first embodiment in that the axial bending process and the through hole forming process are omitted, and a tapered tube-shaped link part having a straight axis is manufactured. Therefore, differences from the above-described first embodiment will be mainly described, other matters will be the same as those of the first embodiment, and duplicate description thereof will be omitted.

In a manufacturing method for a link part of the present embodiment, the axial bending process of the first embodiment is omitted. Therefore, the manufacturing method for a link part of the present embodiment includes a die-cutting process (material preparation process), a burring process, a U-bending process, a reinforcing process, an O-bending process, and a metal core extracting process.

In the die-cutting process, a prepared flat plate is fixed on a recessed groove of a die-cutting machine. Then, a die and a punch are brought close to each other by a punch drive mechanism of the die-cutting machine, and thereby a protruding part of the punch punches the flat plate to form a flat plate material Pb. The flat plate material Pb includes a portion P2b serving as a first side wall W2b, a portion P3b serving as a second side wall W3b, and a portion P1b serving as a connecting wall W1b in FIG. 12(c). At this time point, a first pilot hole and a second pilot hole, and a pair of through holes c1b and d1b have been formed.

Further, instead of the die cutting by a combination of the punch and the die, die cutting by laser processing may also be performed.

In the burring process, the flat plate material Pb obtained by the die-cutting process is fixed on a die of a burring machine. Then, when the punch is made to pass through the first pilot hole and the second pilot hole by a punch drive mechanism of the burring machine, burring holes a1b and b1b are formed in the first pilot hole and the second pilot hole. The flat plate material Pb obtained in this way is shown in FIG. 12(a). Further, burring holes may also be formed in the through holes c1b and d1b.

In the U-bending process, as shown in FIG. 12(b), the flat plate material Pb after the burring process is placed on a die 10b, and the flat plate material Pb is pressed by a punch 20b by a punch drive mechanism of a U-bending machine and is pushed into a recessed groove 11bb. As a result, the portion P2b and the portion P3b are bent to face each other with the portion P1b of the flat plate material Pb as a boundary. Thereafter, an intermediate part Wb is taken out from the recessed groove 11bb.

In the reinforcing process, the intermediate part Wb obtained in the U-bending process is fixed to a first holding mechanism of a metal core inserting and removing machine. Next, a driving force applied from the drive mechanism moves the first holding mechanism to insert the metal core 30b into the buffing holes a1b and b1b of the intermediate part Wb coaxially. The intermediate part Wb after the metal core 30b is inserted is shown in FIG. 12(c).

When the metal core 30b is press-fitted in the reinforcing process, a tensile force along inner circumferential surfaces of the buffing holes a1b and b1b is applied to the burring holes a1b and b1b. Since the burring holes a1b and b1b are reinforced from the inside by the tensile force, deformation of the burring holes a1b and b1b can be effectively curbed. Since the buffing holes a1b and b1b are circular, the tensile force serves as a hoop force applied to the burring holes a1b and b1b.

In the O-bending process, the intermediate part Wb obtained in the reinforcing process is accommodated in a recessed groove 51b of a lower die 50b as shown in FIG. 12(d). Then, a first core 70b and a second core 80b are inserted between the first side wall W2b and the second side wall W3b by a core drive mechanism.

Next, an upper die 60b is lowered toward the lower die 50b by a die drive mechanism to perform the O-bending processing so that upper end edges of the first side wall W2b and the second side wall W3b are brought close to each other by a recessed groove 61b. When the upper end edges align with each other, a cross section perpendicular to the longitudinal direction becomes a closed cross-sectional shape at any position of the intermediate part Wb in the longitudinal direction, and the O-bending process is completed. Further, the upper end edges may be joined to each other by welding or the like.

During the O-bending process, since the inner circumferential surfaces of the burring holes a1b and b1b of the intermediate part Wb are always supported by the metal core 30b, processing accuracy thereof is maintained without being damaged.

Further, when the mating portions between the upper end edge of the first side wall W2b and the upper end edge of the second side wall W3b at one end portion and the other end portion of the intermediate part Wb are circular or elliptical when viewed in a cross section perpendicular to the longitudinal direction, the process of inserting the first core 70b and the second core 80b may be omitted.

In the metal core extracting process, the metal core 30b is extracted from the burring holes a1b and b1b. As a result, a tapered tube-shaped link part having a straight axis is completed. Further, when the metal core 30b is used as it is as a part of the link part, the metal core extracting process is omitted.

According to the manufacturing device and the manufacturing method for a link part described above, even when an external force for performing the O-bending shown in FIG. 12(d) is applied to the intermediate part Wb, roundness and axial core accuracy of the burring holes a1b and b1b are always maintained by the metal core 30b. Therefore, the link part having the burring holes a1b and b1b (connecting holes) with high dimensional accuracy can be obtained.

Further, a case in which the burring holes a1b and b1b are formed as the connecting holes has been exemplified. However, the present invention is not limited only to this embodiment, and furthermore, the burring process may be omitted. In this case, after the flat plate material Pb is obtained in the die-cutting process, the U-bending process is performed without performing the burring process. Then, the first pilot hole and the second pilot hole obtained in the die-cutting process serve as the above-described connecting holes.

An outline of each embodiment described above is summarized below.

(1) A manufacturing method for a link part of the present embodiment is a method for manufacturing a link part L including one end portion LA having connecting holes (a first pilot hole and a second pilot hole or burring holes a1 and b1) and provided on one side in one direction and the other end portion LB provided on the other side in the one direction from an intermediate part W which is long in the one direction and has a first side wall W2 having the first pilot hole (pilot hole), a second side wall W3 having the second pilot hole (pilot hole) coaxial with the first pilot hole and disposed to face the first side wall W2, and a connecting wall W1 connecting a lower edge (one side edge) of the first side wall W2 and a lower edge (one side edge) of the second side wall W3.

Then, the manufacturing method for the link part of the present embodiment includes a reinforcing process of coaxially inserting or press-fitting a metal core 30 into the connecting holes, and an O-bending process of O-bending the first side wall W2 and the second side wall W3 so that an upper edge (the other side edge) of the first side wall W2 and an upper edge (the other side edge) of the second side wall W3 are brought into contact with each other after the reinforcing process.

According to the above-described (1), even when an external force is applied to the first side wall W2 and the second side wall W3 in the O-bending process, since the connecting holes are reinforced in advance by the metal core 30 inserted beforehand in the reinforcing process, deformation of these is effectively curbed.

Further, shapes of the first pilot hole and the second pilot hole are not limited only to a circular shape and may be a non-circular shape. Further, the first pilot hole and the second pilot hole are not limited only to those formed by being surrounded by a completely closed circumferential surface, and a portion thereof may be open. Therefore, the first pilot hole and the second pilot hole may be, for example, a semicircular shape that is open.

(2) The above-described (1) may further include an axial bending process of axially bending the intermediate part W so that the connecting wall W1 forms a concave arc in a view of facing the first side wall W2 by simultaneously applying an external force to both an inner surface of the connecting wall W1 of the intermediate part W and an outer circumferential surface of the metal core 30 after the reinforcing process and before the O-bending process.

In a case of the above-described (2), since an external force is simultaneously applied to both the connecting wall W1 and the metal core 30, the metal core 30 follows the axial bending deformation of the connecting wall W1 without delay. Therefore, since the metal core 30 can also follow deformation of the first side wall W2 and the second side wall W3 that are integrated with the connecting wall W1, the connecting holes being deformed due to delay in movement of the metal core 30 do not occur.

(3) In the above-described (2), in the axial bending process, the axial bending may be performed by pressing a pressurizing surface 41 having a linear portion in a side view against an upper surface (inner surface) of the connecting wall W1.

In a case of the above-described (3), the inner surface of the connecting wall W1 is pressurized by the linear pressurizing surface 41 in a side view. Since the inner surface of the connecting wall W1 is axially bent without being partially bulged while maintaining a straight state, a force of locally pulling the connecting holes is not generated. Therefore, in addition to the reinforcing effect due to the metal core 30, a link part L1 with higher dimensional accuracy can be obtained.

(4) In any one of the above-described (1) to (3), a first core 70 sandwiched between the first side wall W2 and the second side wall W3 and sandwiched between the outer circumferential surface of the metal core 30 and the inner surface of the connecting wall W1 before performing the O-bending may be inserted or press-fitted into an end portion of the intermediate part W in the O-bending process.

In a case of the above-described (4), a distance and a degree of parallelization between the first side wall W2 and the second side wall W3 are kept constant and a distance between the connecting wall W1 and the metal core 30 is kept constant by the first core 70. Therefore, even when an external force for O-bending is applied in the O-bending process, an influence on dimensional accuracy and positional accuracy of the connecting hole can be suppressed, and thereby the link part L with higher dimensional accuracy can be manufactured.

(5) In any one of the aspects of the above-described (1) to (4), a diameter ratio calculated by dividing an outer diameter of the metal core 30 by an inner diameter of each of the first pilot hole and the second pilot hole may be larger than 1.000.

In a case of the aspect of the above-described (5), the metal core 30 can be press-fitted into the first pilot hole and the second pilot hole.

(6) In the above-described (1), the following may also apply. A burring process of forming burring holes a1 and b1 having burring vertical walls a and b in the first pilot hole and the second pilot hole is performed before the reinforcing process, and the metal core 30 is coaxially inserted or press-fitted into the burring holes a1 and b1 instead of the first pilot hole and the second pilot hole in the reinforcing process.

Also in a case of the above-described (6), the same operation and effects as in the above-described (1) can be obtained. That is, even when an external force is applied to the first side wall W2 and the second side wall W3 in the O-bending process, since the buffing holes a1 and b1 are reinforced in advance by the metal core 30 inserted or press-fitted in the reinforcing process, deformation of the connecting holes can be effectively curbed.

Further, shapes of the buffing holes a1 and b1 are not limited only to a circular shape and may be a non-circular shape. Further, the burring holes a1 and b1 are not limited only to those formed by being surrounded by a completely closed circumferential surface, and a portion thereof may be open. Therefore, the burring holes a1 and b1 may be, for example, a semicircular shape that is open.

(7) The above-described (6) may further include an axial bending process of axially bending the intermediate part W so that the connecting wall W1 forms a concave arc in a view of facing the first side wall W2 by simultaneously applying an external force to both an inner surface of the connecting wall W1 of the intermediate part W and outer circumferential surfaces a2 and b2 of the burring vertical walls a and b with the metal core 30 inserted or press-fitted therein after the reinforcing process and before the O-bending process.

Also in a case of the above-described (7), the same operation and effects as in the above-described (2) can be obtained. That is, since an external force is simultaneously applied to both the connecting wall W1 and the burring vertical walls a and b, the burring vertical walls a and b and the metal core 30 follow the axial bending deformation of the connecting wall W1 without delay. Therefore, since the burring vertical walls a and b and the metal core 30 can also follow deformation of the first side wall W2 and the second side wall W3 that are integrated with the connecting wall W1, the burring holes a1 and b1 being deformed due to delay in movement of the metal core 30 do not occur.

(8) In the above-described (7), in the axial bending process, the axial bending may be performed by pressing the pressurizing surface 41 having a portion formed in a linear shape in a side view against the inner surface of the connecting wall W1.

Also in a case of the above-described (8), the same operation and effects as in the above-described (3) can be obtained. Therefore, according to the present aspect, since a concave curved surface is not generated on the connecting wall W1, deformation of the burring holes a1 and b1 can be curbed, and dimensional accuracy of the connecting holes formed by the burring holes a1 and b1 can be further enhanced.

(9) In any one of the above-described (6) to (8), a first core 70 sandwiched between the first side wall W2 and the second side wall W3 and sandwiched between the outer circumferential surfaces a2 and b2 of the burring vertical walls a and b and the inner surface of the connecting wall W1 before performing the O-bending may be inserted or press-fitted into the end portion of the intermediate part W in the O-bending process.

In a case of the above-described (9), the same operation and effects as in the above-described (4) can be obtained. That is, a distance and a degree of parallelization between the first side wall W2 and the second side wall W3 are kept constant and a distance between the connecting wall W1 and the buffing vertical walls a and b is kept constant by the first core 70. Therefore, even when an external force for O-bending is applied in the O-bending process, an influence on dimensional accuracy and positions of the buffing holes a1 and b1 can be suppressed, and thereby the link part L1 with higher dimensional accuracy can be manufactured.

(10) In any one of the aspects of the above-described (6) to (9), a diameter ratio calculated by dividing an outer diameter of the metal core 30 by an inner diameter of each of the burring holes a1 and b1 may be larger than 1.000.

In a case of the aspect the above-described (10), the metal core 30 can be press-fitted into the burring holes a1 and b1.

(11) As in the second embodiment described with reference to FIGS. 9 and 10, the following may be employed in the above-described (1). An axial bending process of axially bending the intermediate part W so that the connecting wall W1 forms a concave shape in a view of facing the first side wall W2 by applying an external force to a second end portion in a state in which a pair of metal cores 230 inserted or press-fitted into the pilot holes (or burring holes a1 and b1) are fixed at regular positions, and an arbitrary position on the connecting wall W1 between a first end portion serving as one end portion LA and the second end portion serving as the other end portion LB is supported is further provided after the reinforcing process and before the O-bending process.

In a case of the above-described (11), even while the intermediate part W is axially bent, shapes of the pilot holes (or buffing holes a1 and b1) are always maintained by the pair of metal cores 230 inserted or press-fitted therein.

(12) The following may be employed in the above-described (11). A buffing process of forming buffing holes a1 and b1 having burring vertical walls a and b in the pilot holes is performed before the reinforcing process, and the metal core 230 is coaxially inserted or press-fitted into the buffing holes a1 and b1 instead of the pilot holes in the reinforcing process.

In a case of the above-described (12), while the intermediate part W is axially bent, shapes of the burring holes a1 and b1 are always maintained by the metal cores 230 inserted or press-fitted therein.

(13) In any one of the above-described (1) to (12), a die-cutting process (material preparation process) of preparing a flat plate material P having a portion P2 serving as the first side wall W2, a portion P3 serving as the second side wall W3, and a portion P1 serving as the connecting wall W1 by punching a flat plate, and a U-bending process of bending the flat plate material P so that the portion P2 serving as the first side wall W2 and the portion P3 serving as the second side wall W3 face each other with the portion P1 to be the connecting wall W1 as a boundary may be performed before the reinforcing process.

In a case of the above-described (13), the intermediate part W having the first pilot hole and the second pilot hole coaxial with each other can be obtained by the U-bending process after the die-cutting process. Further, the buffing vertical walls a and b that partition the burring holes a1 and b1 may be formed by performing burring on the first pilot hole and the second pilot hole before the U-bending process.

(14) In any one of the above-described (1) to (13), the metal core 30 may be used as a part of the link part L, and an opening of the metal core 30 may be used as the connecting hole.

In a case of the above-described (14), a process of removing the metal core 30 from the link part L and a post-process of reinforcing the first pilot hole and the second pilot hole or the burring holes a1 and b1 of the link part L are unnecessary. Therefore, productivity can be further enhanced.

(15) A manufacturing device for a link part according to the present embodiment is a device for manufacturing a link part L including one end portion LA having connecting holes (a first pilot hole and a second pilot hole or burring holes a1 and b1) and provided on one side in one direction and the other end portion LB provided on the other side in the one direction from an intermediate part W which is long in the one direction and has a first side wall W2 having a first pilot hole, a second side wall W3 having a second pilot hole coaxial with the first pilot hole and disposed to face the first side wall W2, and a connecting wall W1 connecting a lower edge (one side edge) of the first side wall W2 and a lower edge (one side edge) of the second side wall W3.

The manufacturing device for the link part includes a metal core 30 which is coaxially inserted or press-fitted into the first pilot hole and the second pilot hole, a lower die 50 (first die) which receives the intermediate part W and has a recessed groove 51 (first recessed surface) having a shape that aligns with an outer shape of the link part L, an upper die 60 (second die) which accommodates the intermediate part W together with the lower die 50 and has a recessed groove 61 (second recessed surface) that comes into contact with both an upper edge (the other side edge) of the first side wall W2 and an upper edge (the other side edge) of the second side wall W3 to bring them closer to each other, and a die drive mechanism (first drive mechanism) which brings relative positions between the lower die 50 and the upper die 60 closer to and further away from each other.

According to the above-described (15), first, the metal core 30 is coaxially inserted or press-fitted into the first pilot hole and the second pilot hole. Thereafter, the intermediate part W in which the first pilot hole and the second pilot hole are reinforced by the metal core is placed as it is on the recessed groove 51 of the lower die 50. Thereafter, relative positions between the lower die 50 and the upper die 60 are brought closer to each other by the die drive mechanism to accommodate the intermediate part W together with the lower die 50, and thereby both are aligned. At that time, the recessed groove 61 of the upper die 60 comes into contact with both the upper edge of the first side wall W2 and the upper edge of the second side wall W3, and both are brought closer to each other and aligned. The intermediate part W in which a cross section perpendicular to a longitudinal direction has a closed cross-sectional shape can be obtained by the O-bending. Moreover, the first pilot hole and the second pilot hole are continuously reinforced by the metal core 30 even during the O-bending. Therefore, even when an external force is applied to the first side wall W2 and the second side wall W3 for the O-bending, since the first pilot hole and the second pilot hole are reinforced in advance by the metal core 30 inserted or press-fitted therein beforehand, deformation of the first pilot hole and second pilot hole can be effectively curbed.

(16) The above-described (15) may further include a die 10 (third die) including a convex bottom surface 11d (first arcuate surface) configured to be in contact with an outer surface of the connecting wall W1, a first side surface configured to be in contact with an outer surface of the first side wall W2, and a second side surface configured to be in contact with an outer surface of the second side wall W3, a punch 40 (fourth die) including a concave pressurizing surface 41 (second arcuate surface) configured to be in contact with an inner surface of the connecting wall W1, a side surface 22 (third side surface) configured to be in contact with an inner surface of the first wall W2, a side surface 23 (fourth side surface) configured to be in contact with an inner surface of the second side wall W3, and a holding surface 44 (metal core holding surface) configured to be in contact with an outer circumferential surface of the metal core 30, and a punch drive mechanism (second drive mechanism) which brings relative positions between the die 10 and the punch 40 closer to and further away from each other.

In a case of the above-described (16), the intermediate part W is disposed in the die 10 so that the outer surface of the connecting wall W1 is in contact with the bottom surface 11d, the outer surface of the first side wall W2 is in contact with the first side surface, and the outer surface of the second side wall W3 is in contact with the second side surface. Then, relative positions between the die 10 and the punch 40 are brought closer by a driving force of the punch drive mechanism. As a result, the pressurizing surface 41 comes into contact with the inner surface of the connecting wall W1, the side surface 22 is in sliding contact with the inner surface of the first side wall W2, the side surface 23 is in sliding contact with the inner surface of the second side wall W3, and then the holding surface 44 abuts against the outer circumferential surface of the metal core 30. When the relative positions between the die 10 and the punch 40 are further brought closer to each other, the connecting wall W1 is bent in accordance with shapes of the bottom surface 11d and the pressurizing surface 41. Then, the first side wall W2 and the second side wall W3 are also bent as the connecting wall W1 is deformed. In this way, the axial bending of the intermediate part W is completed.

During the axial bending, since a force of the punch drive mechanism can be simultaneously applied to both the connecting wall W1 and the metal core 30, the metal core 30 can be made to follow the deformation operation of the axial bending of the connecting wall W1 without delay. Therefore, since the metal core 30 also follows deformation of the first side wall W2 and the second side wall W3 that are integrated with the connecting wall W1, the first pilot hole and the second pilot hole being deformed due to delay in movement of the metal core 30 do not occur.

(17) In the above-described (16), the following may also apply. A pressure receiving part of the pressurizing surface 41 which receives a portion serving as one end portion LA in the intermediate part W is linear when viewed in a longitudinal section including a direction in which the pressurizing surface 41 extends, and the pressurizing surface 41 in a portion facing the pressure receiving part via the connecting wall W1 in the pressurizing surface 41 is linear in the longitudinal sectional view.

In a case of the above-described (17), since the portion of the connecting wall W1 serving as one end portion LA in the intermediate part W is sandwiched between the pressure receiving part and the pressurizing surface 41 that are linear to each other in a longitudinal sectional view, the axial bending can be performed while the inner surface of the connecting wall W1 maintains a linear shape. That is, since the inner surface of the connecting wall W1 is axially bent without being partially bulged while maintaining a straight state, a force of locally pulling the connecting holes is not generated. Therefore, in addition to the reinforcing effect due to the metal core 30, higher dimensional accuracy can be obtained.

(18) In the above-described (17), in the recessed groove 61, the recessed groove 61 that pressurizes a portion serving as the one end portion in the intermediate part W may be linear when viewed in a longitudinal section including a direction in which the recessed groove 61 extends.

In a case of the above-described (18), as a result of performing the O-bending of aligning the upper edge of the first side wall W2 and the upper edge of the second side wall W3 with each other by the recessed groove 61 of the upper die 60, the aligned portion follows a shape of the recessed groove 61 and forms a linear shape in a side view. Thereby, even when the first core 70 is inserted into one end portion of the intermediate part W during the O-bending, since the aligned portion is supported by the linear recessed groove 61, deformation that bulges in a direction away from the metal core 30 does not occur. Therefore, a likelihood of damaging dimensional accuracy of the first pilot hole and the second pilot hole can be further reduced.

(19) Any one of the above-described (15) to (18) may further include a first core 70 inserted between the first side wall W2 and the second side wall W3 and between the outer circumferential surface of the metal core 30 and the inner surface of the connecting wall W1, and a core drive mechanism that inserts and removes the first core 70 with respect to the lower die 50 and the upper die 60.

In a case of the above-described (19), a part of the first core 70 can be inserted between the first side wall W2 and the second side wall W3 and between the outer circumferential surface of the metal core 30 and the inner surface of the connecting wall W1 by receiving a driving force of the core drive mechanism. That is, a distance and a degree of parallelization between the first side wall W2 and the second side wall W3 are kept constant and a distance between the connecting wall W1 and the metal core 30 is kept constant by the first core 70. Therefore, even when an external force for O-bending is applied to the first side wall W2 and the second side wall W3, an influence on dimensional accuracy and positional accuracy of the first pilot hole and the second pilot hole can be suppressed, and thereby the link part L with higher dimensional accuracy can be manufactured.

(20) In the above-described (15), the following may also apply. A buffing machine for forming buffing holes a1 and b1 having burring vertical walls a and b in the first pilot hole and the second pilot hole of the intermediate part W is further provided, and the metal core 30 is coaxially inserted into the burring holes a1 and b1.

Also in a case of the above-described (20), the same operation and effects as in the above-described (15) can be obtained. That is, the pair of burring holes a1 and b1 are continuously reinforced by the metal core 30 even during the O-bending. Therefore, even when an external force is applied to the first side wall W2 and the second side wall W3 for the O-bending, since the buffing holes a1 and b1 are reinforced in advance by the metal core 30 inserted or press-fitted therein beforehand, deformation of the burring holes a1 and b1 can be effectively curbed.

(21) The above-described (20) may further include a die 10 (third die) including a convex bottom surface 11d (first arcuate surface) configured to be in contact with an outer surface of the connecting wall W1, a first side surface configured to be in contact with an outer surface of the first side wall W2, and a second side surface configured to be in contact with an outer surface of the second side wall W3, a punch 40 (fourth die) including a concave pressurizing surface 41 (second arcuate surface) configured to be in contact with an inner surface of the connecting wall W1, a side surface 42 (third side surface) configured to be in contact with an inner surface of the first side wall W2, a side surface 43 (fourth side surface) configured to be in contact with an inner surface of the second side wall W3, and a holding surface 44 (metal core holding surface) that abuts against an outer circumferential surface of the metal core 30 via the burring vertical walls a and b, and a punch drive mechanism (second drive mechanism) which brings relative positions between the die 10 and the punch 40 closer to and further away from each other.

In a case of the above-described (21), the same operation and effects as in the above-described (16) can be obtained. That is, the intermediate part W is disposed in the die 10 so that the outer surface of the connecting wall W1 is in contact with a bottom surface 11*d*, the outer surface of the first side wall W2 is in contact with the first side surface, and the outer surface of the second side wall W3 is in contact with the second side surface. Then, relative positions between the die 10 and the punch 40 are brought closer by a driving force of the punch drive mechanism. As a result, the pressurizing surface 41 comes into contact with the inner surface of the connecting wall W1, the side surface 42 is in sliding contact with the inner surface of the first side wall W2, the side surface 43 is in sliding contact with the inner surface of the second side wall W3, and then the holding surface 44 abuts against outer circumferential surfaces a2 and b2 of the burring vertical walls a and b. When the relative positions between the die 10 and the punch 40 are further brought closer to each other, the connecting wall W1 is bent in accordance with shapes of the bottom surface 11*d* and the pressurizing surface 41. Then, the first side wall W2 and the second side wall W3 are also bent as the connecting wall W1 is deformed. In this way, the axial bending of the intermediate part W is completed.

During the axial bending, since a force of the punch drive mechanism can be simultaneously applied to both the connecting wall W1 and the burring vertical walls a and b, the burring vertical walls a and b can be made to follow the deformation operation of the axial bending of the connecting wall W1 without delay. Therefore, since the burring vertical walls a and b also follows the first side wall W2 and the second side wall W3 that perform deformation operations by being integrated with the connecting wall W1, the burring vertical walls a and b are not deformed by the metal core 30.

(22) In the above-described (21), the following may also apply. A pressure receiving part of the pressurizing surface 41 which receives a portion serving as one end portion LA in the intermediate part W is linear when viewed in a longitudinal section including a direction in which the pressurizing surface 41 extends, and a first pressurizing part of the pressurizing surface 41 facing the pressure receiving part via the connecting wall W1 is linear when viewed in the longitudinal section.

Also in a case of the above-described (22), the same operation and effects as in the above-described (17) can be obtained. Therefore, according to the present aspect, since a concave curved surface is not generated on the connecting wall W1, deformation of the burring holes a1 and b1 can be curbed, and dimensional accuracy of the connecting holes formed by the buffing holes a1 and b1 can be further enhanced.

(23) In the above-described (22), a pressurizing part (second pressurizing part) of the recessed groove 61 that pressurizes a portion serving as one end portion LA in the intermediate part W may be linear when viewed in a longitudinal section including a direction in which the recessed groove 61 extends.

Also in a case of the above-described (23), the same operation and effects as in the above-described (18) can be obtained. Therefore, according to the present aspect, a likelihood of damaging the dimensional accuracy of the burring holes a1 and b1 can be further reduced.

(24) The above-described (20) to (23) may further include a first core 70 (core) inserted between the first side wall W2 and the second side wall W3 and between outer circumferential surfaces a2 and b2 of the burring vertical walls a and b and an inner surface of the connecting wall W1, and a core drive mechanism that inserts and removes the first core 70 with respect to a lower die 50 and an upper die 60.

Also in a case of the above-described (24), the same operation and effects as in the above-described (19) can be obtained. Therefore, according to the present aspect, even when an external force for O-bending is applied to the first side wall W2 and the second side wall W3, an influence on dimensional accuracy and positions of the burring holes a1 and b1 can be suppressed, and thereby a link part L1 with higher dimensional accuracy can be manufactured.

(25) As in the second embodiment described with reference to FIGS. 9 and 10, the following configuration may be further provided in the aspect according to the above-described (15).

That is, a manufacturing device for a link part includes a die (fifth die) 10, a punch (sixth die) 40, a fourth drive mechanism (not shown in the drawings) which brings relative positions between the die 10 and the punch 40 closer to and further away from each other, and a fifth drive mechanism (not shown in the drawings) for inserting and removing a pair of metal cores 230 with respect to a pair of through holes 10A1 and 10B1 provided in the die 10.

Here, the die 10 includes an arcuate surface (third arcuate surface) 11A configured to be in contact with an outer surface of the connecting wall W1 and having a convex shape in a longitudinal sectional view, an inner side surface 11B (fifth side surface) configured to be in contact with an outer surface of the first side wall W2, an inner side surface (sixth side surface) 11C configured to be in contact with an outer surface of the second side wall W3, and a pair of through holes 10A1 and 10B1 coaxially penetrating the inner side surfaces 11B and 11C. Also, the punch 40 includes an arcuate surface (fourth arcuate surface) 40A configured to be in contact with an inner surface of the connecting wall W1 and having a concave shape in a longitudinal sectional view, an outer side surface (seventh side surface) 40B configured to be in contact with an inner surface of the first side wall W2, and an outer side surface (eighth side surface) 40C configured to be in contact with an inner surface of the second side wall W3.

In a case of the above-described (25), first, an intermediate part W is disposed in the die 10 so that the outer surface of the connecting wall W1 is in contact with the arcuate surface 11A, the outer surface of the first side wall W2 is in contact with the inner side surface 11B, and the outer surface of the second side wall W3 is in contact with the inner side surface 11C. Next, the metal cores 230 are inserted or press-fitted into a pair of pilot holes of the intermediate part W to penetrate all of the through hole 10A1, the pair of pilot holes of the intermediate part W, and the through hole 10B1 (so that all are coaxial). Thereby, a state is brought about in which a connecting part is fixed at its regular position in the fifth die by the metal core at a position between a first end portion serving as one end portion LA and a second end portion serving as the other end portion LB in the intermediate part W, and a part of the connecting wall W1 between the first end portion and the second end portion abuts against a convex arcuate surface 40A and is supported thereby. With the intermediate part W supported at two points in the die 10 in this way, the punch 40 is brought closer to the die 10 by a driving force of the fifth drive mechanism. Then, the arcuate surface 40A comes into contact with the inner surface of the connecting wall W1 on the second end portion side and pushes it down. As a result, the intermediate part W is axially bent with a position of the outer surface of the connecting wall W1 supported by the arcuate surface 40A as a fulcrum. Even when the axial bending is performed, since the pair of pilot holes are reinforced by the metal cores 230 inserted therein in advance, an influence on dimensional accuracy and positions thereof can be curbed.

(26) In the above-described (25), the following configuration may be employed.

That is, the metal cores 230 includes a metal core (first part metal core) 230a inserted into and removed from the through hole of the inner side surface (the fifth side surface) 11B, and a metal core (second part metal core) 230b inserted into and removed from the through hole of the inner side surface (the sixth side surface) 11C and coaxial with the metal core 230a. Also, the fifth drive mechanism includes a first drive unit (not shown in the drawings) for inserting and removing the metal core 230a into and from the through hole of the first side wall W2, and a second drive unit (not shown in the drawings) for inserting and removing the metal core 230b into and from the through hole of the second side wall W3.

In a case of the above-described (26), the intermediate part W is disposed in the die 10 so that the through hole of the inner side surface (fifth side surface) 11B is coaxial with one of the pair of pilot holes of the intermediate part W, and the through hole of the inner side surface (sixth side surface) 11C is coaxial with the other of the pair of pilot holes of the intermediate part W. Next, the metal core 230a is inserted or press-fitted into one of the pilot holes of the intermediate part W via the through hole of the inner side surface 11B by the first drive unit. Similarly, the metal core 230b is inserted or press-fitted into the other of the pilot holes of the intermediate part W via the through hole of the inner side surface 11C by the second drive unit. When the metal cores 230a and 230b are inserted, the pair of pilot holes of the intermediate part W can be reinforced before proceeding to the next process.

(27) Any one of the above-described (15) to (26) may further include a die (seventh die) 10 having a recessed groove 11 that aligns with a portion serving as the connecting wall W1 in a flat plate material P having a portion P2 serving as the first side wall W2, a portion P3 serving as the second side wall W3, and a portion P1 serving as the connecting wall W1, a punch (eighth die) 20 inserted into and removed from the recessed groove 11 with the flat plate material P sandwiched therebetween, and a punch drive mechanism (third drive mechanism) that brings relative positions between the die 10 and the punch 20 closer to and further away from each other.

In a case of the above-described (27), the flat plate material P is placed on the die 10 so that the portion P1 serving as the connecting wall W1 is overlapped on the recessed groove 11. Then, the die 10 and the punch 20 are relatively brought closer to each other by a driving force of the punch drive mechanism. As a result, the flat plate material P is U-bent by the punch 20 being inserted into the recessed groove 11. Then, the intermediate part W having a first pilot hole and a second pilot hole or burring holes a1 and b1 can be obtained.

Further, in manufacturing the link part, a range of a plate thickness of the intermediate part W is preferably 1.0 mm or more and 4.0 mm or less, and more preferably 1.4 mm or more and 1.8 mm or less.

Also, as a material of the intermediate part W, a steel material or an aluminum material having a tensile strength of 440 MPa to 980 MPa can be exemplified.

EXAMPLE

In order to investigate how (1) Presence or absence of metal core, (2) Types of metal core, (3) Ratio of perimeter difference in metal core, (4) Presence or absence of external force on metal core affect roundness and coaxiality of the connecting holes when manufacturing the link part L from the intermediate part W, the link part L shown in FIG. 1 was manufactured under conditions shown as No. 1 to No. 10 in Table 1.

Dimensions and shapes including plate thicknesses of the intermediate part W used for the manufacture and the manufactured link part L were assumed to be all the same. Also, in all the examples, a steel material having a tensile strength of 440 MPa and a plate thickness of 2.8 mm was used.

TABLE 1

| Example No. | Presence or absence | Types | Ratio of perimeter difference (%)*1 | Presence or absence of external force | Roundness of hole | Coaxiality of hole | Invention example/ comparative example |
|---|---|---|---|---|---|---|---|
| 1 | Absent | — | — | Absent | Bad | Bad | Comparative example |
| 2 | Present | Integral type | 0.0 | Absent | Good | Good | Invention example |
| 3 | Present | Integral type | 0.3 | Absent | Very Good | Very Good | Invention example |
| 4 | Present | Integral type | 1.0 | Absent | Very Good | Very Good | Invention example |
| 5 | Present | Separate type | 0.3 | Absent | Very Good | Good | Invention example |
| 6 | Present | Integral type | 0.0 | Present | Good | Good | Invention example |
| 7 | Present | Integral type | 0.3 | Present | Excellent | Excellent | Invention example |

TABLE 1-continued

| Example No. | Presence or absence | Types | Ratio of perimeter difference (%)*1 | Presence or absence of external force | Roundness of hole | Coaxiality of hole | Invention example/ comparative example |
|---|---|---|---|---|---|---|---|
| 8 | Present | Integral type | 1.0 | Present | Excellent | Excellent | Invention example |
| 9 | Present | Integral type | 4.0 | Present | Excellent | Excellent | Invention example |
| 10 | Absent | — | — | Present | Bad | Bad | Comparative example |

*1: Ratio of perimeter difference (%) = ((perimeter of metal core − perimeter of burring hole)/perimeter of metal core)*100

(1) Presence or Absence of Metal Core

Of the processes shown in FIGS. 2(a) to 2(h), when the reinforcing process shown in FIG. 2(d) was performed, the presence or absence of the metal core was denoted as "present", and when the reinforcing process was not performed, it was denoted as "absent."

(2) Types of Metal Core

Among examples in which the reinforcing process shown in FIG. 2(d) was performed, a case in which the metal core used an integral ring was denoted as "integral type," and a case in which the metal core used a pair of rings and each burring hole was individually reinforced was denoted as "separate type."

(3) Ratio of Perimeter Difference in Metal Core

A degree of tightness when the metal core is inserted into the burring hole was defined by a ratio of the perimeter difference. When the ratio of the perimeter difference is 0%, it indicates that a perimeter of the burring hole and a perimeter of an outer circumferential surface of the metal core are equal. This case indicates "inserted." On the other hand, a case in which the ratio of the perimeter difference exceeds 0% indicates "press-fitted," and as the value increases, a perimeter of an outer circumferential surface of the metal core becomes larger than a perimeter of the burring hole, and this indicates that a degree of the press fitting is tight. The ratio of the perimeter difference is defined by the following expression (1).

Ratio of perimeter difference(%)=((perimeter of metal core(mm)−perimeter of burring hole (mm))/perimeter of metal core(mm))×100   (Expression 1)

(4) Presence or Absence of External Force on Metal Core,

In the axial bending process shown in FIG. 2(f), a case in which an external force was applied to the burring hole with the metal core inserted therein by the holding surface 44 as shown in FIG. 5 was denoted as "Present," and a case in which an external force was not applied was denoted as "Absent". When the application of the external force was "Present", the intermediate part W was axially bent using the punch 40 having a shape as shown in FIG. 5. On the other hand, when the application of the external force was "Absent," the intermediate part W was axially bent using another punch in which a portion corresponding to the holding surface 44 in the punch 40 shown in FIG. 5 did not abut against the outer circumferential surface of the buffing hole.

After all the processes of FIG. 2 ended, the metal core was removed from the intermediate part W, and roundness of the burring hole and coaxiality of the burring hole were measured.

In the evaluation of roundness, the evaluation was performed by a method of measuring diameters of a portion at which a diameter of the burring hole was maximum and a portion at which a diameter thereof was minimum and using a difference therebetween as the evaluation value. Then, a case in which the evaluation result was more than 0.5 mm was denoted as "Bad," a case of more than 0.3 mm and 0.5 mm or less was denoted as "Good," a case of more than 0.1 mm and 0.3 mm or less was denoted as "Very Good," and a case of 0.1 mm or less was denoted as "Excellent."

Also, in the evaluation of coaxiality, the evaluation was performed by a method of obtaining positions of centroids of the pair of burring holes and using a distance between the centroids in a plan view of the burring holes as the evaluation value. Then, a case in which the evaluation result was more than 0.5 mm was denoted as "Bad," a case of more than 0.3 mm and 0.5 mm or less was denoted as "Good," a case of more than 0.1 mm and 0.3 mm or less was denoted as "Very Good," and a case of 0.1 mm or less was denoted as "Excellent."

From the results in Table 1, examples 1 and 10 in which the metal core was not used showed inferior results in both the roundness and the coaxiality.

Also, in examples 2 and 6 in which the ratio of the perimeter difference was 0.0% and the metal core was inserted instead of press-fitting, the necessary conditions were satisfied in both the roundness and the coaxiality.

Further, in examples 3 to 5 and 7 to 9 in which the metal core having the ratio of the perimeter difference of more than 0% was press-fitted, even better results were shown in both the roundness and the coaxiality.

From the results described above, it was ascertained that the ratio of the perimeter difference was preferably 0.2% or more. A higher hoop force can be obtained as the ratio of the perimeter difference becomes larger, but when it exceeds 5.0%, the hoop force is too strong and this may cause breakage of the burring hole. Therefore, the ratio of the perimeter difference is preferably within a range of 0.2% to 5.0%.

Also, although the ratio of the perimeter difference was satisfied, the coaxiality was slightly low in example 5 in which the metal core of separate type was used compared to that in examples 3, 4, and 7 to 9 in which the metal core of integral type was used. From this, it was ascertained that the integral type was more preferable to the separate type as the metal core in terms of the axial core accuracy.

INDUSTRIAL APPLICABILITY

According to the manufacturing method and manufacturing device for a link part of the present invention, a link part having a connecting hole with high dimensional accuracy can be obtained. Therefore, industrial applicability is high.

BRIEF DESCRIPTION OF THE REFERENCE SYMBOLS

10 Die (third die, fifth die, seventh die)
10A1, 10B1 Through hole
11 Recessed groove
11A Arcuate surface (third arcuate surface)
11B Inner side surface (fifth side surface)
11C Inner side surface (sixth side surface)
11d Bottom surface (first arcuate surface)
20 Punch (eighth die)
30, 230 Metal core
40 Punch (fourth die, sixth die)
40A Arcuate surface (fourth arcuate surface)
40B Outer side surface (seventh side surface)
40C Outer side surface (eighth side surface)
41 Pressurizing surface (second arcuate surface)
42 Side surface (third side surface)
43 Side surface (fourth side surface)
44 Holding surface (metal core holding surface)
50 Lower die (first die)
51 Recessed groove (first recessed surface)
60 Upper die (second die)
61 Recessed groove (second recessed surface)
70 First core (core)
230a Metal core (first part metal core)
230b Metal core (second part metal core)
a, b Burring vertical wall
a1, b1 Burring hole
a1a, b1a Pilot hole
a2, b2 Outer circumferential surface of burring vertical wall
L, L1, L2 Link part
LA One end portion of link part
LB The other end portion of link part
P Flat plate material
P1, P1a, P1b Portion serving as connecting wall
P2, P2a, P2b Portion serving as first side wall
P3, P3a, P3b Portion serving as second side wall
W, Wa, Wb Intermediate part
W1, W1a, W1b Connecting wall
W2, W2a, W2b First side wall
W3, W3a, W3b Second side wall

The invention claimed is:

1. A manufacturing method for a link part which is a method for manufacturing
a link part including one end portion having a connecting hole and provided on one side in one direction from
an intermediate part which is long in the one direction and has a first side wall and a second side wall each having a pilot hole at least at one end portion and disposed to face each other and a connecting wall connecting one side edge of the first side wall and one side edge of the second side wall, and the other end portion provided on the other side therefrom in the one direction,
the manufacturing method for the link part comprising:
a reinforcing process of inserting a metal core into the pilot hole in the first side wall and the pilot hole in the second side wall; and
an O-bending process of O-bending the first side wall and the second side wall so that the other side edge of the first side wall and the other side edge of the second side wall are brought into contact with each other after the reinforcing process.

2. The manufacturing method for a link part according to claim 1, further comprising
an axial bending process of axially bending the intermediate part so that the connecting wall forms a concave shape in a view of facing the first side wall by simultaneously applying an external force to both an inner surface of the connecting wall of the intermediate part and an outer circumferential surface of the metal core after the reinforcing process and before the O-bending process.

3. The manufacturing method for a link part according to claim 2, wherein
the axial bending is performed by pressing a pressurizing surface having a linear shape in a side view against the inner surface of the connecting wall in the axial bending process.

4. The manufacturing method for a link part according to claim 1, wherein
a core sandwiched between the first side wall and the second side wall and sandwiched between the outer circumferential surface of the metal core and the inner surface of the connecting wall is inserted, before performing the O-bending, into an end portion of the intermediate part in the O-bending process.

5. The manufacturing method for a link part according to claim 1, wherein
a diameter ratio calculated by dividing an outer diameter of the metal core by an inner diameter of the pilot hole is larger than 1.000.

6. The manufacturing method for a link part according to claim 1, wherein
a burring process of forming a burring hole having a burring vertical wall in the pilot hole is performed before the reinforcing process, and
the metal core is inserted into the burring hole instead of the pilot hole in the reinforcing process.

7. The manufacturing method for a link part according to claim 6, further comprising
an axial bending process of axially bending the intermediate part so that the connecting wall forms a concave shape in a view of facing the first side wall by simultaneously applying an external force to both an inner surface of the connecting wall of the intermediate part and an outer circumferential surface of the burring vertical wall with the metal core inserted, after the reinforcing process and before the O-bending process.

8. The manufacturing method for a link part according to claim 7, wherein
the axial bending is performed by pressing a pressurizing surface having a linear shape in a side view against the inner surface of the connecting wall in the axial bending process.

9. The manufacturing method for a link part according to claim 6, wherein
a core sandwiched between the first side wall and the second side wall and sandwiched between the outer circumferential surface of the burring vertical wall and the inner surface of the connecting wall is inserted, before performing the O-bending, into the one end portion of the intermediate part in the O-bending process.

10. The manufacturing method for a link part according to claim 6, wherein
a diameter ratio calculated by dividing an outer diameter of the metal core by an inner diameter of the burring hole is larger than 1.000.

11. The manufacturing method for a link part according to claim 1, further comprising an axial bending process of axially bending the intermediate part, after the reinforcing process and before the O-bending process, so that the connecting wall forms a concave shape in a view of facing the first side wall by applying an external force to a second end portion in a state in which a position of the metal core inserted into the pilot hole is fixed and an arbitrary position on the connecting wall between a first end portion serving as one end portion and the second end portion serving as the other end portion of the link part is supported.

12. The manufacturing method for a link part according to claim 11, wherein a burring process of forming a burring hole having a burring vertical wall in the pilot hole is performed before the reinforcing process, and the metal core is inserted into the burring hole instead of the pilot hole in the reinforcing process.

13. The manufacturing method for a link part according to claim 1, wherein a material preparation process of preparing a flat plate material having a portion serving as the first side wall, a portion serving as the second side wall, and a portion serving as the connecting wall, and a U-bending process of bending the flat plate material so that the portion serving as the first side wall and the portion serving as the second side wall face each other with the portion serving as the connecting wall as a boundary, are performed before the reinforcing process.

14. The manufacturing method for a link part according to claim 1, wherein the metal core is used as a part of the link part, and an opening of the metal core is used as the connecting hole.

* * * * *